United States Patent
Cho

(10) Patent No.: US 8,621,356 B1
(45) Date of Patent: Dec. 31, 2013

(54) VIDEO EDITING METHOD AND DIGITAL DEVICE THEREFOR

(75) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 13/593,306

(22) Filed: Aug. 23, 2012

Related U.S. Application Data

(60) Provisional application No. 61/657,042, filed on Jun. 8, 2012.

(30) Foreign Application Priority Data

Jul. 16, 2012 (KR) ........................ 10-2012-0077353

(51) Int. Cl.
*G06F 3/00* (2006.01)
*G06F 3/01* (2006.01)

(52) U.S. Cl.
USPC ........... 715/723; 715/719; 715/716; 715/787; 715/721; 715/720; 386/342; 386/54; 386/55; 386/46

(58) Field of Classification Search
USPC ............ 386/55, 54, 46, 52, 68, 282; 715/723, 715/200, 719, 716, 715, 787, 721, 720
See application file for complete search history.

(56) References Cited

U.S. PATENT DOCUMENTS

| | | | |
|---|---|---|---|
| 5,732,184 A * | 3/1998 | Chao et al. ..................... | 386/282 |
| 6,414,686 B1 * | 7/2002 | Protheroe et al. ............. | 345/474 |
| 7,444,593 B1 * | 10/2008 | Reid .............................. | 715/723 |
| 7,725,828 B1 * | 5/2010 | Johnson ......................... | 715/726 |
| 7,769,819 B2 | 8/2010 | Lerman et al. | |
| 7,890,867 B1 * | 2/2011 | Margulis ........................ | 715/723 |
| 8,170,396 B2 | 5/2012 | Kuspa et al. | |
| 2004/0001079 A1 * | 1/2004 | Zhao et al. .................... | 345/719 |
| 2004/0155982 A1 * | 8/2004 | Jeong ............................. | 348/565 |
| 2004/0267952 A1 * | 12/2004 | He et al. ........................ | 709/231 |
| 2006/0059426 A1 * | 3/2006 | Ogikubo ........................ | 715/723 |
| 2006/0168521 A1 * | 7/2006 | Shimizu et al. ............... | 715/530 |
| 2006/0222320 A1 | 10/2006 | Bushell et al. | |
| 2007/0189708 A1 * | 8/2007 | Lerman et al. .................. | 386/52 |
| 2007/0268406 A1 | 11/2007 | Bennett | |
| 2008/0155617 A1 * | 6/2008 | Angiolillo et al. ............. | 725/93 |
| 2008/0256449 A1 * | 10/2008 | Bhatt ............................. | 715/720 |
| 2008/0301112 A1 | 12/2008 | Wu | |
| 2010/0172626 A1 * | 7/2010 | Lee et al. ....................... | 386/68 |

(Continued)

FOREIGN PATENT DOCUMENTS

KR 10-2007-0092369 A 9/2007
KR 10-2010-0086136 A 7/2010

*Primary Examiner* — Ramsey Refai
*Assistant Examiner* — Toan Vu
(74) *Attorney, Agent, or Firm* — Birch, Stewart, Kolasch & Birch, LLP

(57) ABSTRACT

A method for editing the playback speed of a partial sequence of video and a digital device therefor are disclosed. A video editing method includes providing a timeline interface corresponding to a video sequence, receiving a first user input for specifying a first location on the timeline interface and a second user input for specifying a second location on the timeline interface, setting an editing interval between the first location and the second location of the timeline interface, receiving a third user input with respect to the editing interval, adjusting at least one of the thickness and length of the editing interval in response to the third user input, and editing playback attributes of the partial sequence based on the adjusted thickness and length of the editing interval.

24 Claims, 38 Drawing Sheets

(56) References Cited

U.S. PATENT DOCUMENTS

| | | | |
|---|---|---|---|
| 2010/0178024 A1* | 7/2010 | Agarwal et al. | 386/52 |
| 2010/0281371 A1* | 11/2010 | Warner et al. | 715/720 |
| 2010/0281377 A1* | 11/2010 | Meaney et al. | 715/723 |
| 2011/0016395 A1* | 1/2011 | Margulis | 715/716 |
| 2011/0052154 A1* | 3/2011 | Weber | 386/280 |
| 2011/0103772 A1* | 5/2011 | Suzuki | 386/285 |
| 2011/0230232 A1* | 9/2011 | Tran | 455/556.1 |
| 2012/0079382 A1* | 3/2012 | Swenson et al. | 715/716 |
| 2012/0210228 A1* | 8/2012 | Wang et al. | 715/723 |
| 2012/0210231 A1* | 8/2012 | Ubillos et al. | 715/723 |
| 2012/0210232 A1* | 8/2012 | Wang et al. | 715/723 |
| 2012/0254752 A1* | 10/2012 | Svendsen et al. | 715/716 |

* cited by examiner

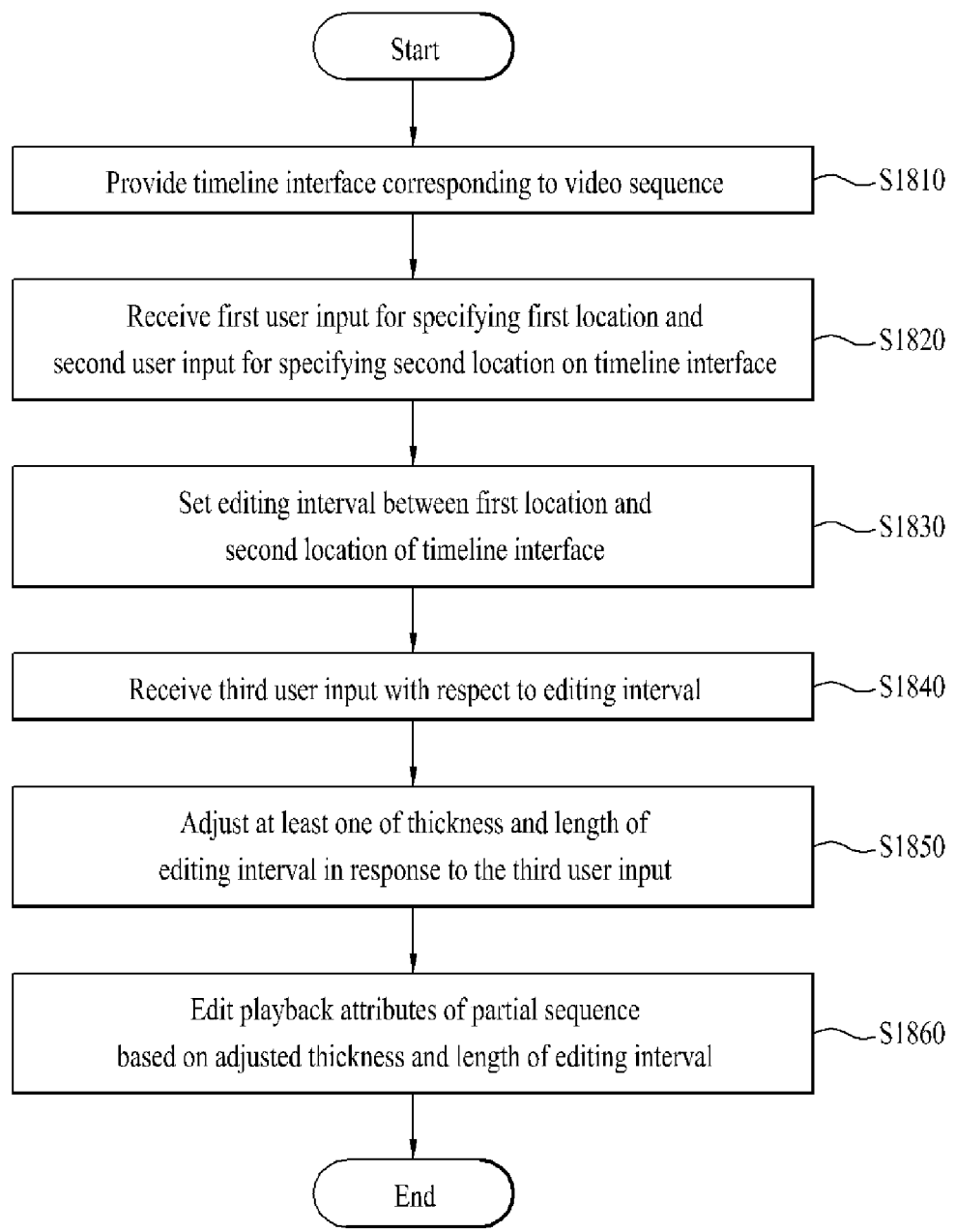

VIDEO EDITING METHOD AND DIGITAL DEVICE THEREFOR

Pursuant to 35 U.S.C. §119(e), this application claims the benefit of U.S. Provisional Application Ser. No. 61/657,042 filed on Jun. 8, 2012, which are hereby incorporated by references as if fully set forth herein.

Pursuant to 35 U.S.C. §119(a), this application claims the benefit of earlier filing date and right of priority to Korean Application No. 10-2012-0077353, filed on Jul. 16, 2012, the contents of which are hereby incorporated by reference herein in their entirety.

BACKGROUND OF THE INVENTION

1. Field of the Invention

The present invention relates to a video editing method and a digital device therefor, and more particularly, to a method for editing a playback speed of a partial sequence of video and a digital device therefor.

2. Discussion of the Related Art

Various applications or programs for video editing have been developed. Such video editing includes copy, deletion, and playback speed adjustment of at least one interval of a video sequence. Video sequence editing may be performed with respect to each preset interval of a video sequence according to an editing application or may be performed with respect to an interval designated by a user. For the video sequence editing, a user input for selecting an interval to be edited and a user input for performing a detailed editing operation with respect to the selected interval should be received.

Meanwhile, recent development of digital device technology makes it possible to perform various types of user inputs such as a touch input and a gesture input as well as a user input through a mouse or a pointer. Accordingly, the video editing application needs to provide a user interface which is capable of easily editing a video sequence through various types of user inputs. Especially, a video editing application is needed which can edit the video sequence through a simple user input and can intuitively represent an editing result.

SUMMARY OF THE INVENTION

An object of the present invention is to provide a video editing method which is capable of editing a video sequence through a simple and intuitive user input.

Another object of the present invention is to provide a method for intuitively providing an editing result of a video sequence edited by a user input to a user.

A further object of the present invention is to provide a method for providing an interface capable of intuitively comparing, in the case of adjustment of the playback speed and playback duration of a partial interval of a video sequence, the adjusted playback speed and playback duration with the playback speed and playback duration of another interval of the video sequence.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video editing method includes providing a timeline interface corresponding to a video sequence; receiving a first user input for specifying a first location on the timeline interface and a second user input for specifying a second location on the timeline interface, wherein the first location corresponds to a first frame of the video sequence and the second location corresponds to a second frame of the video sequence; setting an editing interval between the first location and the second location of the timeline interface, wherein the setting includes providing a first indicator corresponding to the first frame and a second indicator corresponding to the second frame at both ends of the editing interval, at least one of the first indicator and the second indicator is movable on the timeline interface, the editing interval corresponds to a partial sequence of the video sequence, and the partial sequence is a sequence between the first frame and the second frame of the video sequence; receiving a third user input with respect to the editing interval, wherein the third user input includes an input of sliding at least one object of the timeline interface on the timeline interface; adjusting at least one of the thickness and length of the editing interval in response to the third user input, wherein the thickness of the editing interval is proportional to the playback speed of the partial sequence and the length of the editing interval is proportional to the playback duration of the partial sequence; and editing playback attributes of the partial sequence based on the adjusted thickness and length of the editing interval, wherein the playback attributes of the partial sequence include the playback speed of the partial sequence.

In another aspect of the present invention, a digital device includes a processor for controlling operation of the digital device; a sensor unit for receiving a user input and transmitting the user input to the processor; and a display unit for outputting images based on a command of the processor, wherein the processor provides a timeline interface corresponding to a video sequence, receives a first user input for specifying a first location on the timeline interface and a second user input for specifying a second location on the timeline interface, wherein the first location corresponds to a first frame of the video sequence and the second location corresponds to a second frame of the video sequence, sets an editing interval between the first location and the second location of the timeline interface, wherein a first indicator corresponding to the first frame and a second indicator corresponding to the second frame are provided at both ends of the editing interval, at least one of the first indicator and the second indicator is movable on the timeline interface, the editing interval corresponds to a partial sequence of the video sequence, and the partial sequence is a sequence between the first frame and the second frame of the video sequence, receives a third user input with respect to the editing interval, wherein the third user input includes an input of sliding at least one object of the timeline interface on the timeline interface, adjusts at least one of the thickness and length of the editing interval in response to the third user input, wherein the thickness of the editing interval is proportional to the playback speed of the partial sequence and the length of the editing interval is proportional to the playback duration of the partial sequence, and edits playback attributes of the partial sequence based on the adjusted thickness and length of the editing interval, wherein the playback attributes of the partial sequence include the playback speed of the partial sequence.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 18 is a flowchart illustrating a video editing method according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Most terms disclosed in the present invention are defined in consideration of functions of the present invention and correspond to general terms well known in the art and may vary according to intention of those skilled in the art, usual practices, or introduction of new technologies. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The present invention relates to a video editing method and a digital device therefor. More specifically, the present invention relates a method for editing a digital video sequence which can be played back through a digital storage medium, data communication, etc. In the present invention, a video sequence refers to a set of a plurality of frames included in corresponding video and may include information about playback order of the frames, i.e. a playback sequence. The video sequence may include playback attributes such as the playback speed and playback duration of the video sequence.

The present invention provides a video editing User Interface (UI) for editing the video sequence and a device including the video editing UI. Video sequence editing may include playback speed adjustment, playback order adjustment, copy, and deletion for a partial area of the video sequence. The video editing UI according to the embodiment of the present invention may be implemented in a digital device in the form of an application or program. Hereinafter, each control operation of the digital device includes a control operation performed through the video editing UI of the present invention.

Figure 1:
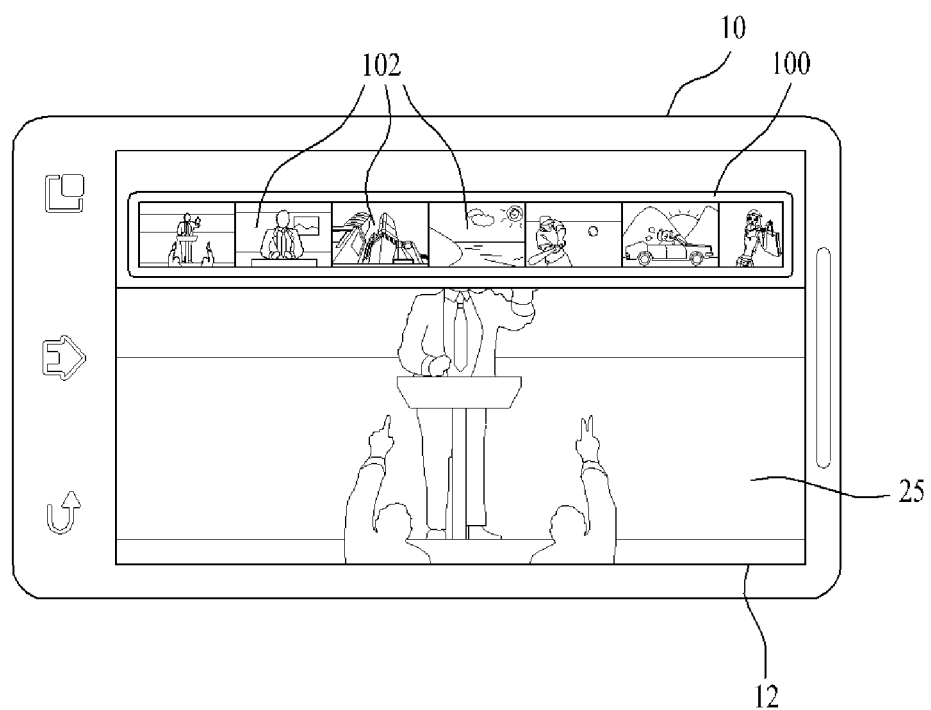
FIG. 1 is a diagram schematically illustrating a video editing UI according to an embodiment of the present invention.

FIG. 1 illustrates a video editing UI according to an embodiment of the present invention. The video editing UI may be displayed in a display unit 12 of a digital device 10 and provides a timeline interface 100 for video editing. The timeline interface 100 corresponds to a video sequence which is being edited and may display at least one thumbnail image 102 of the video sequence at a preset interval. The thumbnail image 102 may indicate an image of a specific frame of the video sequence. Namely, the thumbnail image 102 may indicate an image of a frame corresponding to the location of each thumbnail image 102 on the timeline interface 100. According to the exemplary embodiment of the present invention, the digital device 10 may adjust a preset interval of the thumbnail image 102 in correspondence to the playback speed of the video sequence. In other words, if the playback speed of the video sequence is adjusted to be increased, the digital device 10 may narrow the preset interval of the thumbnail image 102, and if the playback speed of the video sequence is adjusted to be decreased, the digital device 10 may widen the preset interval of the thumbnail image 102.

Meanwhile, the display unit 12 of the digital device 10 may display an image 25 of at least one frame of a video sequence which is being edited through the video editing UI. The frame for display may be a frame corresponding to a user input on the timeline interface 100 or a frame which is being output by the video editing UI. According to the embodiment of the present invention, the digital device 10 may edit a video sequence in response to a user input with respect to the timeline interface 100 of the video editing UI.

Figure 2A:
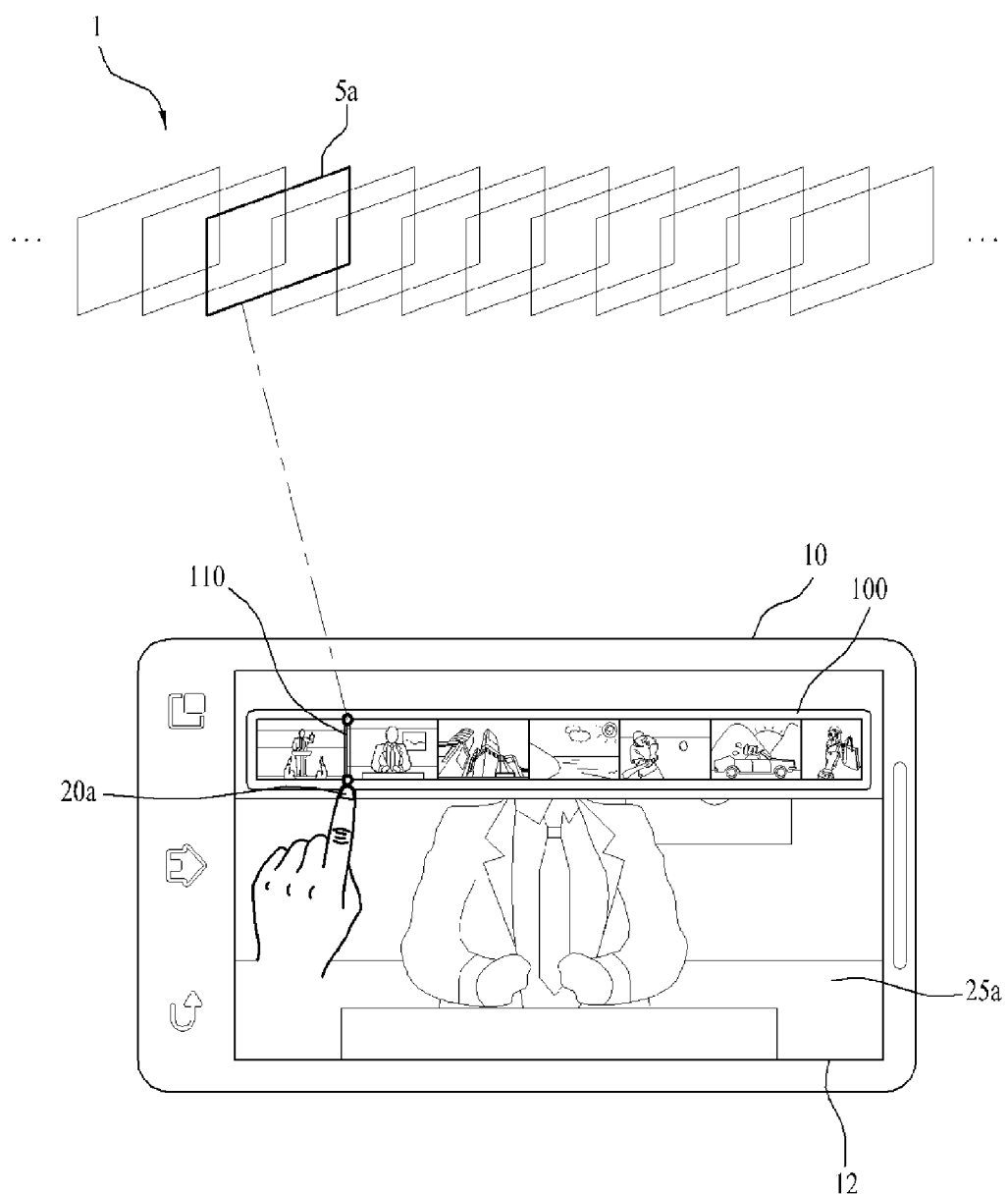
FIGS. 2A and 2B are diagrams illustrating an editing interval setting method for editing a motion picture sequence according to an embodiment of the present invention.
Figure 2B:
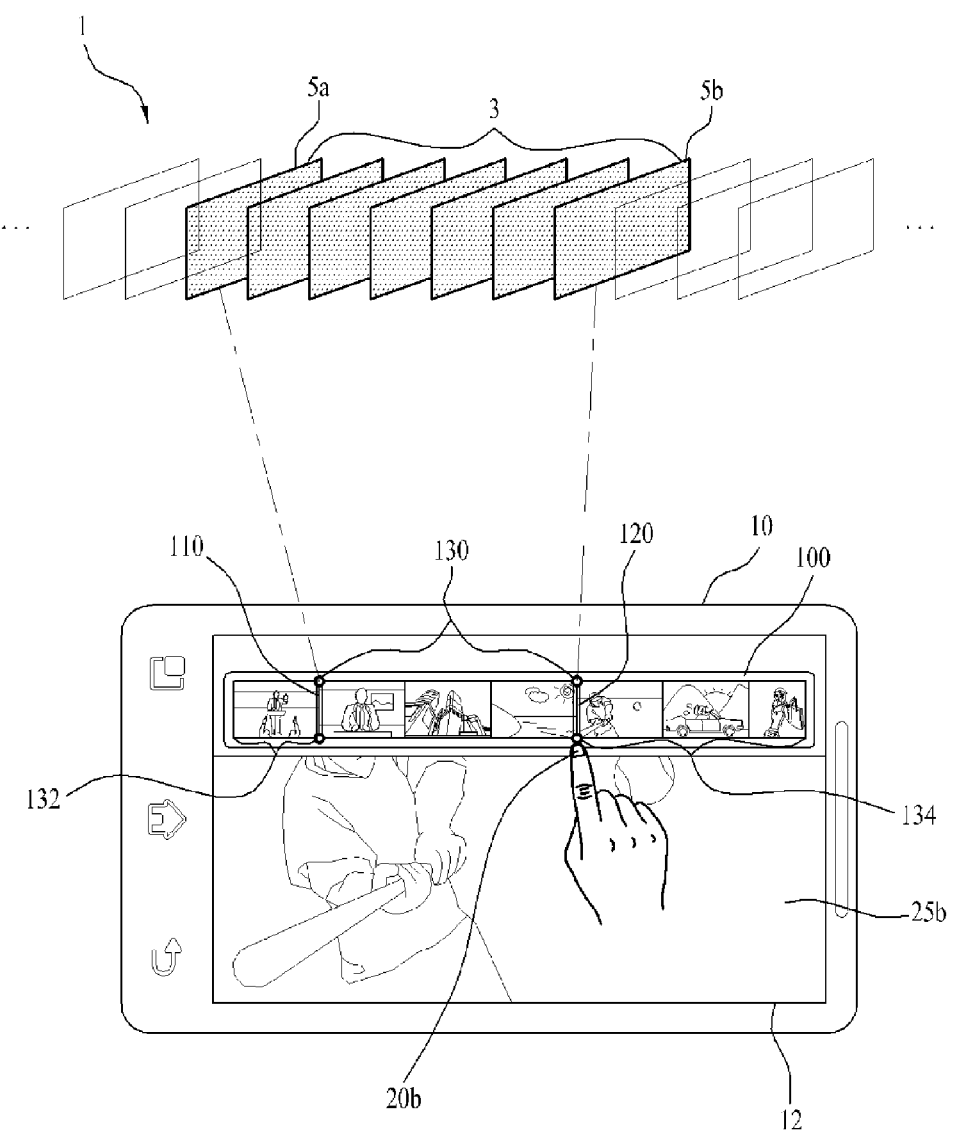

FIGS. 2A and 2B illustrate an editing interval setting method for editing a motion picture sequence. Referring to FIGS. 2A and 2B, the digital device 10 may receive a first user input 20a and a second user input 20b with respect to specific locations on the timeline interface 100 and set an editing interval 130 on the timeline interface 100. According to this embodiment, the editing interval 130 corresponds to a partial sequence 3 for editing playback attributes in a video sequence 1. The digital device 10 may receive user inputs for the editing interval 130 and adjust the playback attributes of the partial sequence 3 based on the user inputs.

More specifically, referring to FIG. 2A, the digital device 10 may receive the first user input 20a for specifying a first location on the timeline interface 100. The first location on the timeline interface 100 corresponds to a first frame 5a of the video sequence 1. Accordingly, the digital device 10 may specify the first frame 5a of the video sequence 1 in response to the first user input 20a for the first location. Referring to FIG. 2B, the digital device 10 may receive the second user input 20b for specifying a second location on the timeline interface 100. The second location on the timeline interface 100 corresponds to a second frame 5b of the video sequence 1. Accordingly, the digital device 10 may specify the second frame 5b of the video sequence 1 in response to the second user input 20b for the second location.

In the embodiment of the present invention, the first location and the second location may be different locations on the timeline interface 100. The first location may precede or follow the second location on the timeline interface 100. The first user input 20a and the second user input 20b may be performed with respect to specific locations on the timeline interface 100 or with respect to specific locations on a virtual track corresponding to the timeline interface 100.

In this way, if the first frame 5a and the second frame 5b are specified on the video sequence 1, the digital device 10 may set a sequence between the first frame 5a and the second frame 5b as the partial sequence 3. The partial sequence 3 of the present invention is an interval selected to edit playback attributes in the video sequence 1. Meanwhile, the digital device 10 may set the editing interval 130 between the first location and the second location on the timeline interface 100. The editing interval 130 of the timeline interface 100 corresponds to the partial sequence 3. A user may adjust the playback attributes of the partial sequence 3 through a user input for the editing interval 130.

In the present embodiment, the editing interval 130 may indicate the playback attributes of the partial sequence 3. That is, the length of the editing interval 130 may indicate the playback duration of the partial sequence 3 and the thickness of the editing interval 130 may indicate the playback speed of the partial sequence 3. More specifically, the digital device 10 may adjust the length of the editing interval 130 such that it is proportional to the playback duration of the partial sequence 3. In this case, the length of the editing interval 130 is the length of a first axis direction of the editing interval 130 and the first axis direction may be a time axis direction of the timeline interface 100. In the present invention, the length of the editing interval 130 is enlarged as the playback duration of the partial sequence 3 increases and is shortened as the playback duration of the partial sequence 3 decreases. The digital device 10 may also adjust the thickness of the editing interval 130 such that it is proportional to the playback speed of the partial sequence 3. In this case, the thickness of the editing interval 130 is the length of a second axis direction of the editing interval and the second axis direction may be a direction orthogonal to the time axis direction of the timeline interface 100. In the present invention, the thickness of the editing interval 130 is enlarged as the playback speed of the partial sequence 3 increases and is reduced as the playback speed of the partial sequence 3 decreases. A user can be intuitively aware of variations in the playback speed and playback duration of the partial sequence 3 through variations in the thickness and length of the editing interval 130 caused by adjustment of the editing interval 130. A detailed description thereof will be given later.

Meanwhile, according to an embodiment of the present invention, frames corresponding to locations at which the user inputs 20a and 20b are performed on the timeline interface 100 may be selected as the first and second frames 5a and 5b. According to another embodiment of the present invention, random access pictures nearest in time to frames corresponding to locations at which the user inputs 20a and 20b are performed on the timeline interface 100 may be selected as the first and second frames 5a and 5b.

In the present embodiment, the first input 20a and the second user input 20b include various types of user input. If a user input is a touch input, the first and second user inputs 20a and 20b may include various touch inputs such as single touch, double touch, and touch and drag on the timeline interface 100. The digital device 10 of the present invention may select the first and second frames 5a and 5b in response to each touch input. For example, if the first user input 20a is single touch, the digital device 10 may set a frame corresponding to a location at which the single touch is performed as the first frame 5a. If the first user input 20a is double touch, the digital device 10 may set a frame corresponding to a location at which final touch of the double touch is performed within a preset time duration as the first frame 5a. If the first user input 20a is touch and drag, the digital device 10 may set a frame corresponding to a location at which a touch and drag operation is ended as the first frame 5a.

Meanwhile, the second user input 20b may be performed at the same time with the first user input 20a or after the first user input 20a. In the present invention, the second frame 5b may be set through the second user input 20b. A setting method of the second frame 5b according to the type of a user input is the same as that of the first frame 5a. Various other input means may be used for the first and second user inputs 20a and 20b in the present invention and the present invention is not limited to the above-described user inputs.

According to the embodiment of the present invention, the digital device 10 may provide, on the timeline interface 100, a first indicator 110 corresponding to the first frame 5a and a second indicator 120 corresponding to the second frame 5b. In the present invention, the first and second indicators 110 and 120 are located at both ends of the editing interval 130 on the timeline interface 100. At least one of the first and second indicators 110 and 120 is movable on the timeline interface 100. In this embodiment, the first and second indicators 110 and 120 indicate the first and second frames 5a and 5b, respectively, constituting the partial sequence 3.

In the embodiment of the present invention, if the editing interval 130 is set on the timeline interface 100, first and second intervals 132 and 134 may be located based on both sides of the editing interval 130. The first interval 132 and the second interval 134 are partial intervals of the timeline interface 100 and are adjacent to both sides of the editing interval 130. Namely, the first interval 132 is an interval adjacent to the first indicator 110 of the editing interval 130 and the second interval 134 is an interval adjacent to the second indicator 120 of the editing interval 130.

Meanwhile, upon receiving the first and second user inputs 20a and 20b, the digital device 10 may display images of the frames 5a and 5b corresponding to the user inputs 20a and 20b on the display unit 12. Namely, in FIG. 2A, if the first user input 20a is received, the digital device 10 may display an image 25a of the first frame 5a corresponding to the first user input 20a on the display unit 12. In FIG. 2B, upon receiving the second user input 20b, the digital device may display an image 25b of the second frame 5b corresponding to the second user input 20b on the display unit 12.

FIGS. 3A to 6 illustrate a video editing method according to an embodiment of the present invention. Referring to FIGS. 3A to 6, the digital device 10 may perform video editing based on an input of sliding at least one partial interval of the timeline interface 100. In this embodiment, sliding refers to continuous movement of a sliding target object, wherein at least one other object on the timeline interface 100 moves dependently on the sliding target object. That is, if a target object on the timeline interface 100 is slid by a user input, the target object may move while maintaining an adjacent state to at least one other object (or objects) adjacent to the target object on the timeline interface 100. In this case, the at least one other object (or objects) adjacent to the target object may move together with the target object according to sliding of the target object. In the embodiment of the present invention, a sliding input may be performed in various ways such as touch and drag, click and drag, point movement, direction switching interface (e.g. direction switching key) input, and preset gesture according to the type of a user input.

Figure 3A:
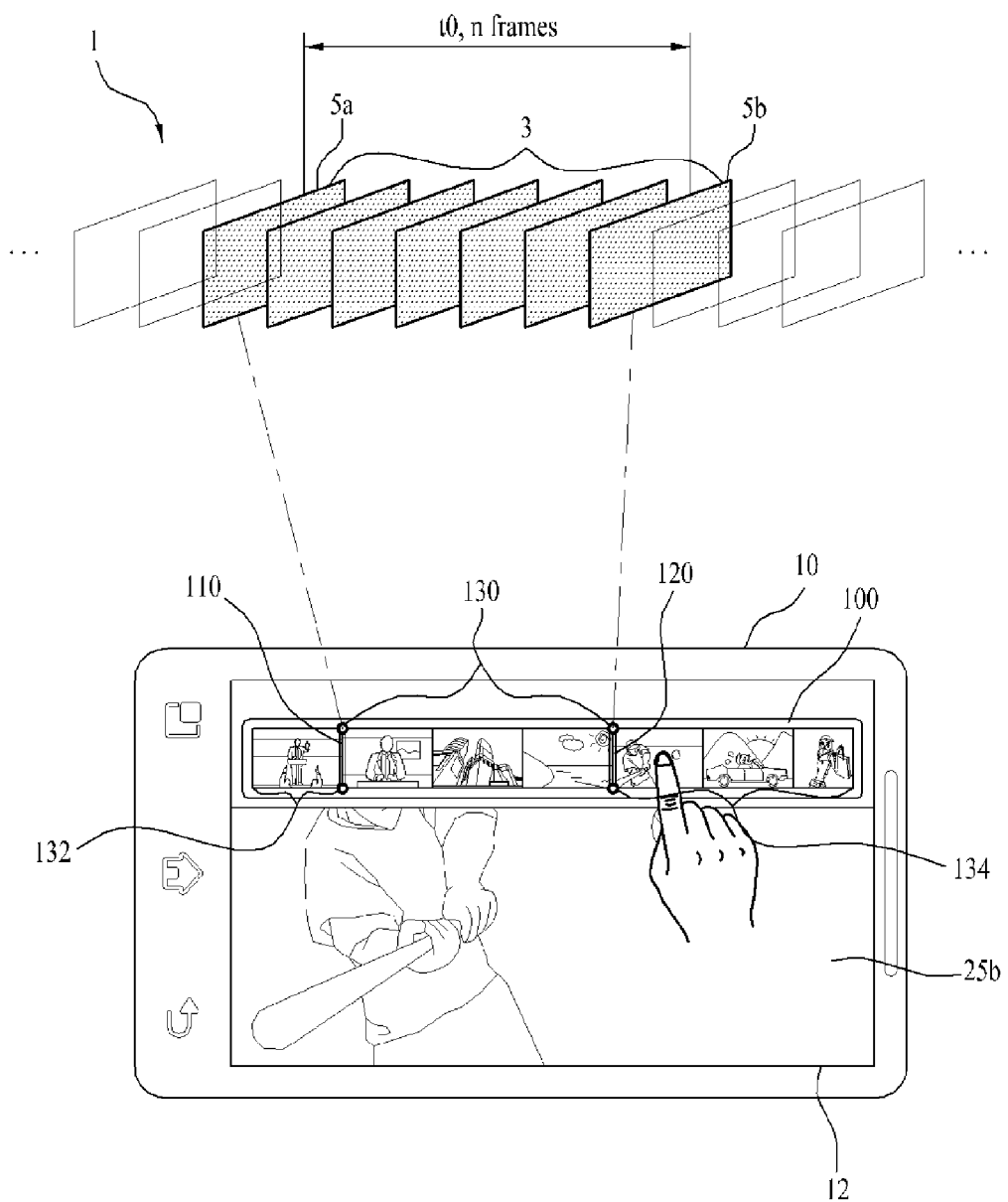
FIGS. 3 to 6 are diagrams illustrating a video editing method according to an embodiment of the present invention.
Figure 3B:
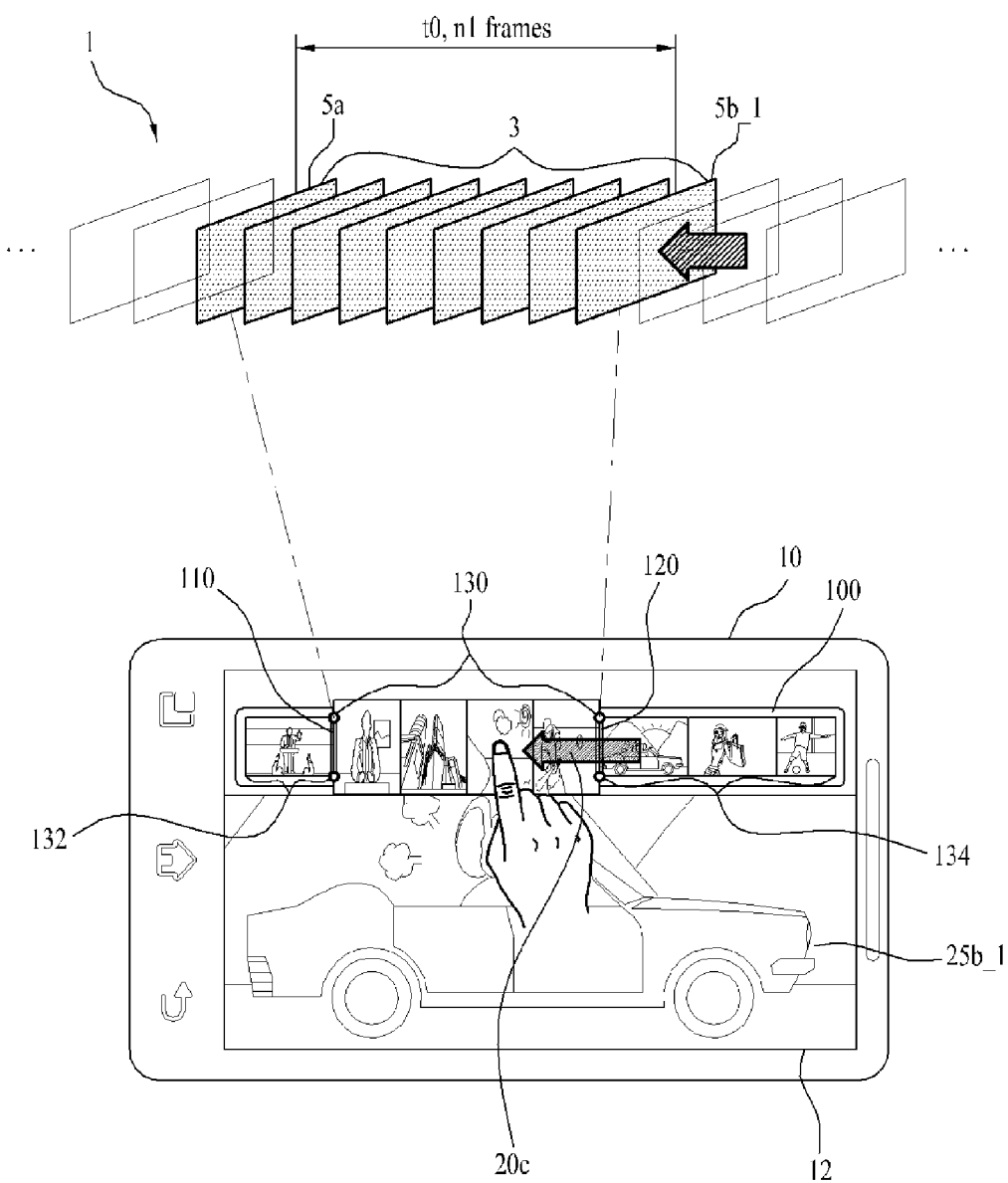
Figure 3C:
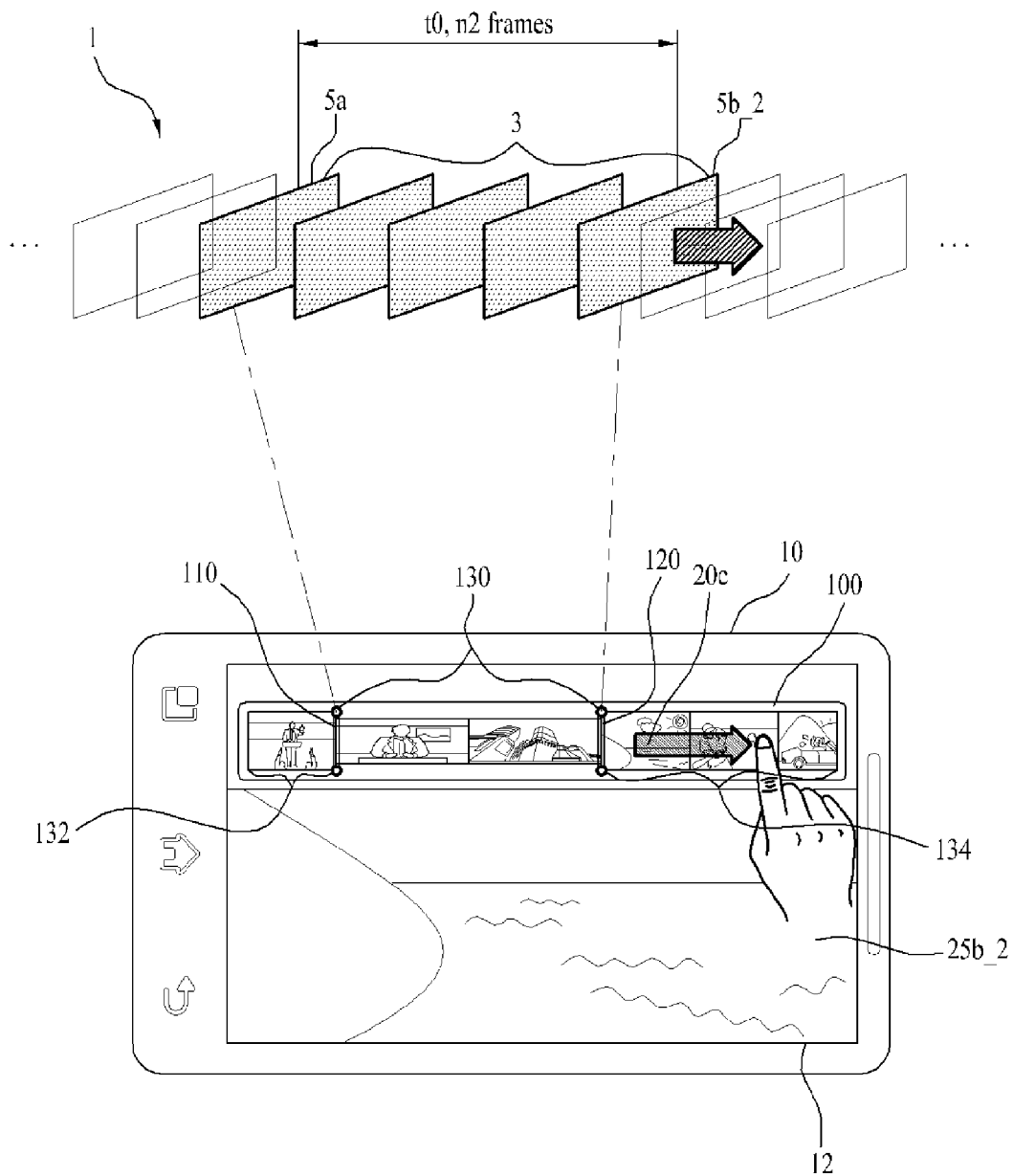

Referring to FIGS. 3A to 3C, the digital device 10 may perform video editing based on an input of sliding at least one of the first interval 132 and the second interval 134 on the timeline interface 100. More specifically, the digital device 10 may receive an input of sliding at least one of the first interval 132 and the second interval 134, reset the partial sequence 3 based on the sliding input, and adjust the playback speed of the partial sequence 3 and the thickness of the editing interval 130. The embodiment of FIGS. 3A to 3C explains the operation of the digital device 10 when the sliding input of the second interval 134 of the timeline interface 100 is received. Even when the sliding input of the first interval 132 of the timeline interface 100 is received, the digital device 10 may perform video editing using the same or corresponding method as a method which will be described hereinbelow.

First, as shown in FIG. 3A, if the first and second frames 5a and 5b are set by first and second user inputs, n frames between the first and second frames 5a and 5b constitute the partial sequence 3. The partial sequence 3 has a playback duration of t0. Meanwhile, the editing interval 130 corresponding to the partial sequence 3 is set on the timeline interface 100. The editing interval 130 includes the first indicator 110 corresponding to the first frame 5a of the partial sequence 3 and the second indicator 120 corresponding to the second frame 5b of the partial sequence 3. In the present invention, the first interval 132 of the timeline interface 100 is an interval adjacent to the first indicator 110 and the second interval 134 of the timeline interface 100 is an interval adjacent to the second indicator 120.

Next, as illustrated in FIGS. 3B and 3C, the digital device 10 may receive a third user input 20c of sliding the second interval 134. The digital device 10 changes the second frame 5b corresponding to the second indicator 120. In this case, the first frame 5a corresponding to the first indicator 110 may be fixed. If the second frame 5b corresponding to the second indicator 120 is changed, the number of frames of the partial sequence 3 may also be changed. In this case, the partial sequence 3 may have the same playback duration compared with a playback duration prior to change of the number of frames and thus the partial sequence 3 may have a playback speed different from a playback speed prior to change of the number of frames. The digital device 10 of the present invention adjusts the thickness of the editing interval 130 while keeping the length of the editing interval 130 constant in order to indicate variation in the playback speed of the partial sequence 3.

For example, as illustrated in FIG. 3B, if the third user input 20c of sliding the second interval 134 toward the editing interval 130 is received, the digital device 10 resets the second frame corresponding to the second indicator 120 to 5b_1. According to the third user input 20c through which frames are inserted into the partial sequence 3, the partial sequence 3 includes n1 (n1>n) frames, which is greater than the number of frames prior to the third user input 20c, with respect to the same playback duration of t0. In addition, the partial sequence 3 has a faster playback speed than prior to the third user input 20c. The digital device 10 of the present invention enlarges the thickness of the editing interval 130 in order to indicate variation in the playback speed of the partial sequence 3. The thickness of the editing interval 130 may be enlarged in proportion to the playback speed of the partial sequence 3. Accordingly, a user can intuitively recognize that the playback speed of the partial sequence 3 corresponding to the editing interval 130 in the video sequence 1 has been adjusted to be increased. Meanwhile, the playback duration t0 of the partial sequence 3 is not changed by the third user input 20c, the digital device 10 keeps the length of the edition interval 130 constant. Meanwhile, the digital device 10 may display an image 25b_1 of the reset second frame 5b_1 on the display unit 12 in response to the third user input 20c.

On the other hand, as illustrated in FIG. 3C, upon receiving the third user input 20c of sliding the second interval 134 to the opposite side of the editing interval 130, the digital device 10 resets the second frame corresponding to the second indicator 120 to 5b_2. According to the third user input 20c through which frames are extracted from the partial sequence 3, the partial sequence 3 includes n2 (n2<n) frames, which is less than the number of frames prior to the third user input 20c, with respect to the same playback duration t0. In addition, the partial sequence 3 has a slower playback speed than a playback speed prior to the third user input 20c. The digital device 10 of the present invention shortens the thickness of the editing interval 130 in order to indicate variation in the playback speed of the partial sequence 3. In this case, the thickness of the editing interval 130 may be shortened in proportion to the playback speed of the partial sequence 3. Accordingly, a user can intuitively recognize that the playback speed of the partial sequence 3 corresponding to the editing region 130 in the video sequence 1 has been adjusted to be decreased. Meanwhile, the playback duration t0 of the partial sequence 3 is not changed by the third user input 20c, the digital device 10 keeps the length of the edition interval 130 constant. The digital device 10 may display an image 25b_2 of the reset second frame 5b_2 on the display unit 12 in response to the third user input 20c.

According to an embodiment of the present invention, the digital device 10 may receive the third user input 20c of sliding the first interval 132. Then, the digital device 10 changes the first frame corresponding to the first indicator 110 in response to the third user input 20c. In this case, the second frame corresponding to the second indicator 120 may be fixed. The digital device 10 may adjust the thickness of the editing interval 130 according to variation in the partial sequence 3 caused by resetting of the first frame. For a detailed method thereof, reference may be made to the description of FIGS. 3A to 3C.

Meanwhile, the digital device 10 may receive the third user input 20c of sliding both the first interval 132 and the second interval 134. In this case, the digital device 10 may reset both the first frame corresponding to the first indicator 110 and the second frame corresponding to the second indicator 120. The playback speed of the partial sequence 3 is determined based on the number of frames between the reset first frame and the reset second frame. The digital device 10 may adjust the thickness of the editing interval 130 in correspondence to the changed playback speed.

Referring to FIGS. 4A to 5B, the digital device 10 may perform video editing based on an input of sliding the editing interval 130.

Figure 4A:
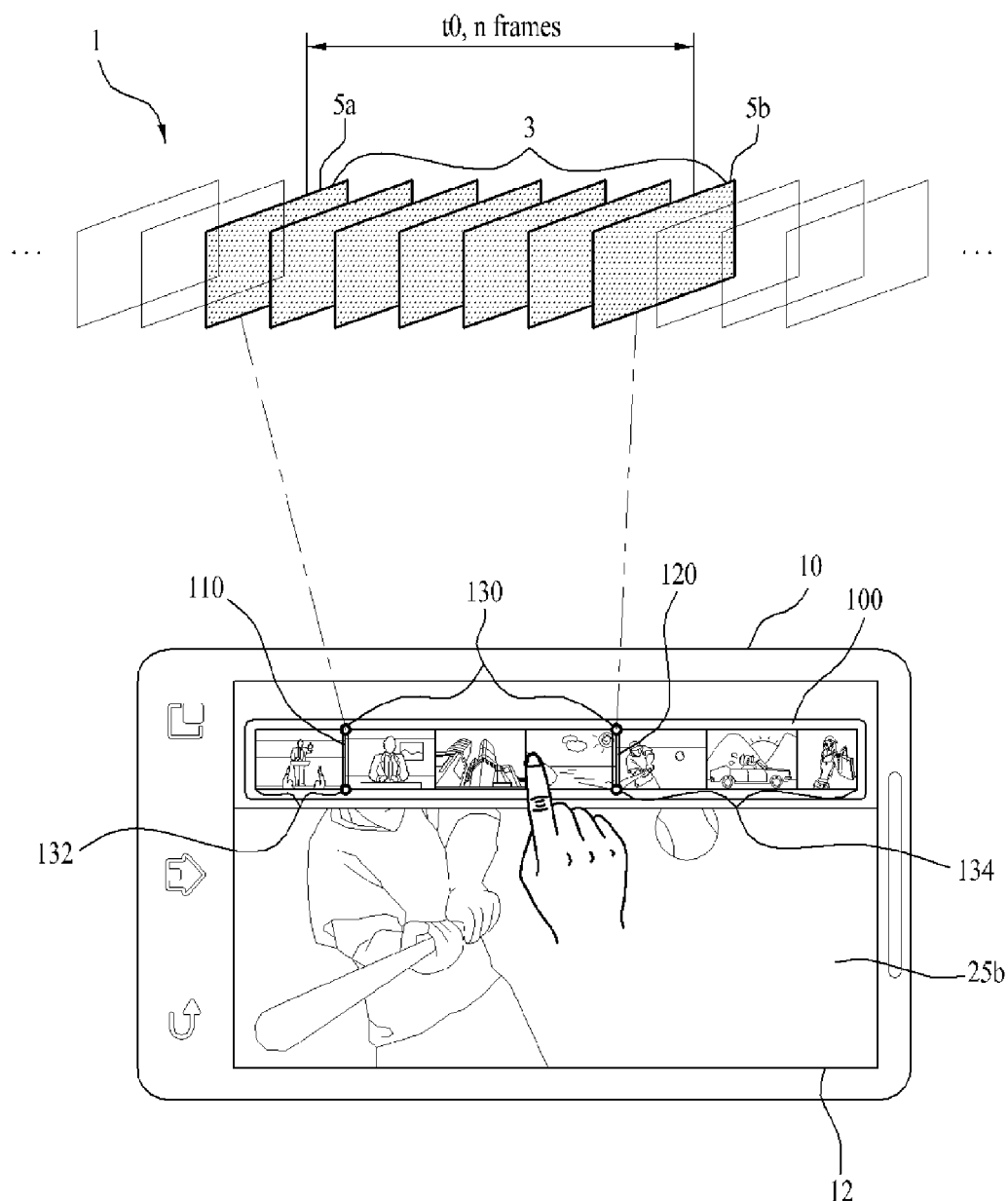
Figure 4B:
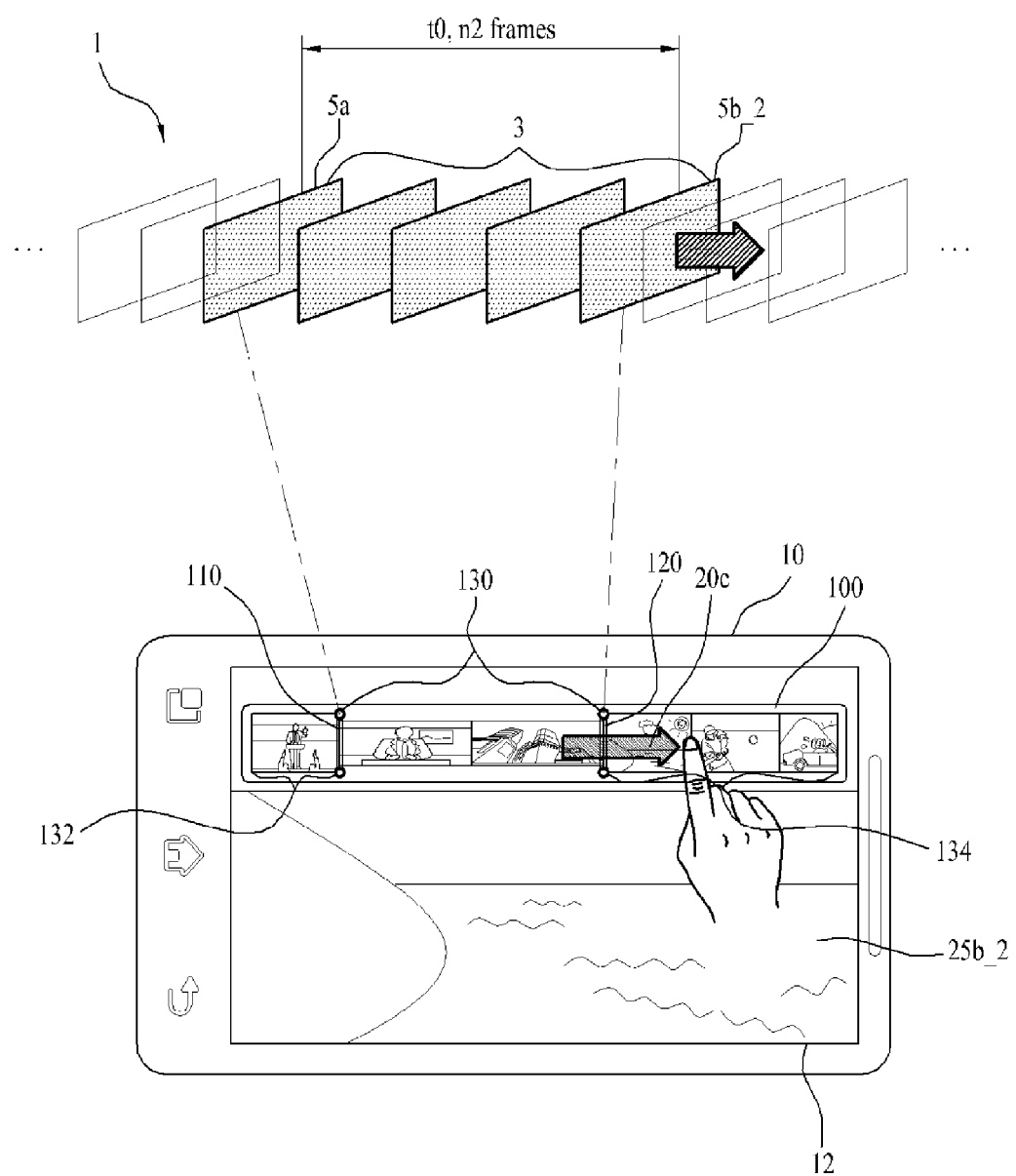

First, as illustrated in FIG. 4B, the digital device 10 may receive the third user input 20c of sliding the editing interval 130 to the first interval 132 or the second interval 134. Thus, if the user input through which frames of the partial sequence 3 corresponding to the editing interval 130 are extracted toward the first interval 132 or the second interval 134 is received, the digital device 10 may reduce the thickness of the editing interval 130 based on the user input.

For example, as illustrated in FIG. 4A, the partial sequence 3 may include n frames during a playback duration of t0. In this case, if the third user input 20c of sliding the editing interval 3 toward the second interval 134 is received as illustrated in FIG. 4B, the digital device 10 resets the second frame corresponding to the second indicator 120 to 5b_2. Then, the partial sequence 3 includes n2 (n2<n) frames, which is less than the number of frames prior to the third user input 20c, with respect to the same playback duration t0. Then, the partial sequence 3 has a slower playback speed than a playback speed prior to the third user input 20c. The digital device 10 of the present invention shortens the thickness of the editing interval 130 in order to indicate variation in the playback speed of the partial sequence 3. The thickness of the editing interval 130 may be shortened in proportion to the playback speed of the partial sequence 3. Meanwhile, the digital device 10 may display an image 25b_2 of the reset second frame 5b_2 on the display unit 12 in response to the third user input 20c.

According to an embodiment of the present invention, the digital device 10 may receive the third user input 20c of sliding the editing interval 3 to the first interval 132. The digital device 10 resets the first frame corresponding to the first indicator 110. The digital device 10 may reduce the thickness of the editing interval 130 according to variation in the partial sequence 3 caused by resetting of the first frame. For a detailed method thereof, reference may be made to the description of FIG. 4B.

Figure 5A:
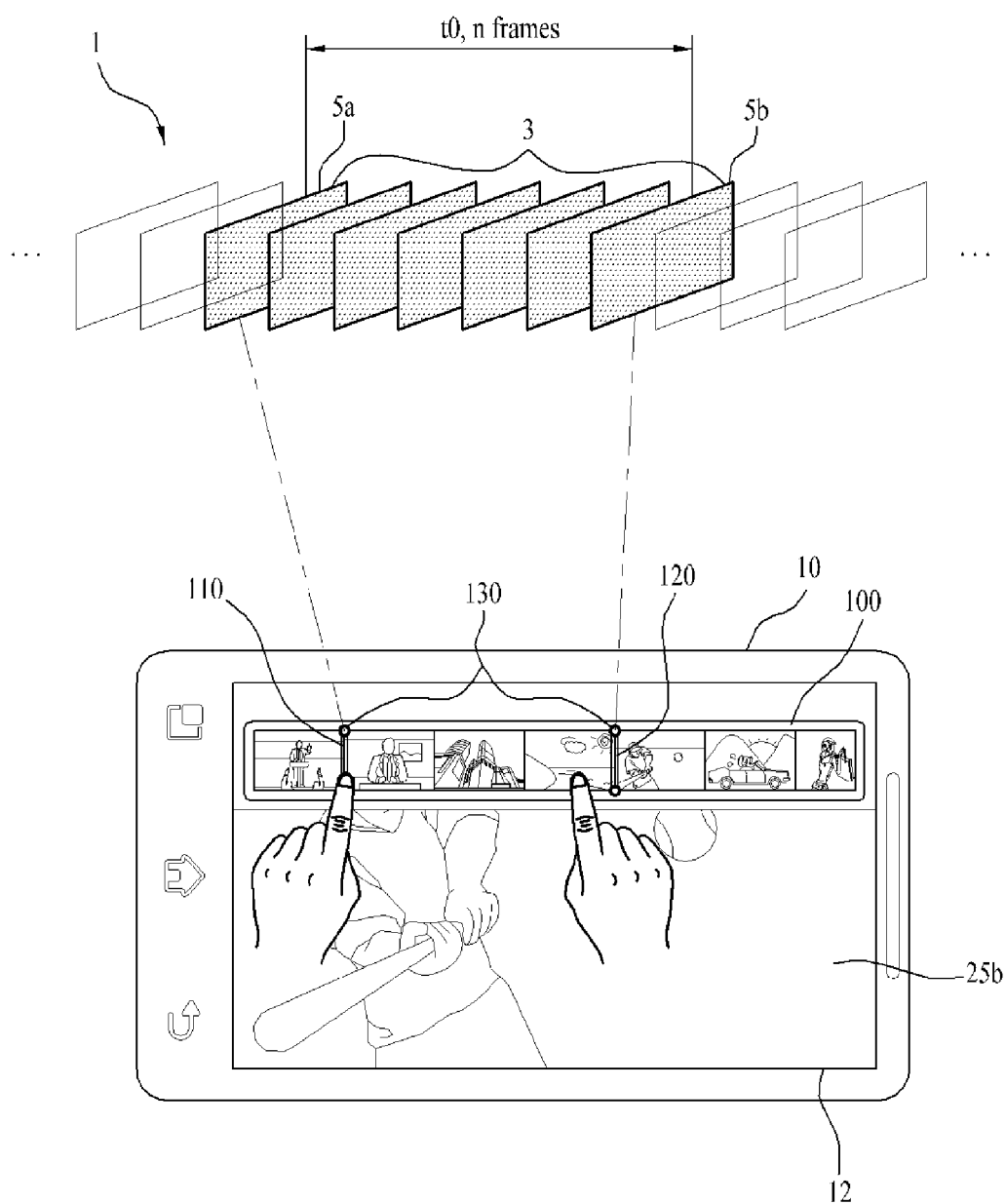
Figure 5B:
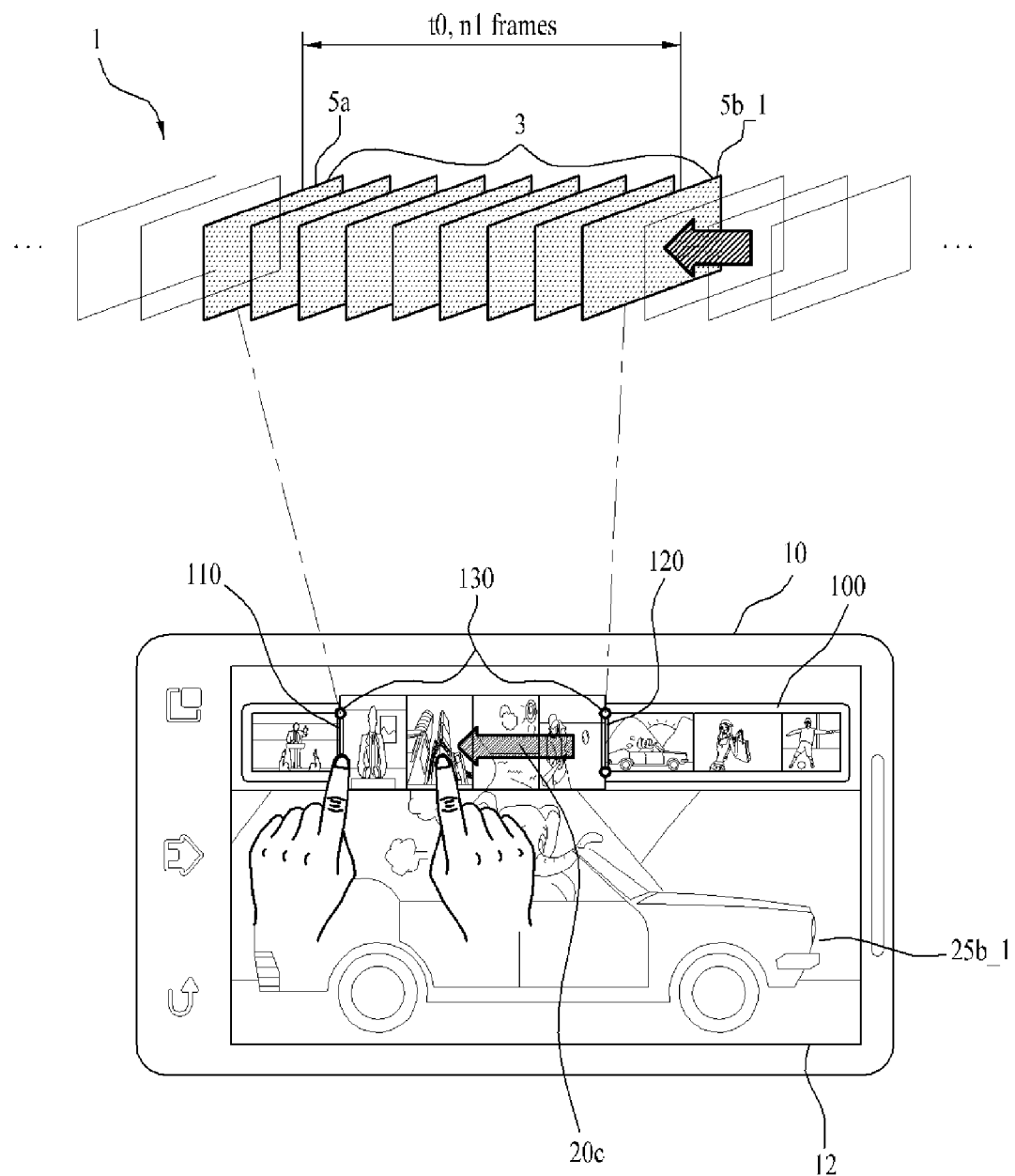

According to another embodiment of the present invention illustrated in FIGS. 5A and 5B, the third user input 20c of sliding the editing interval 130 may include an input for inserting frames into the partial sequence 3. In this case, the third user input 20c may include an input of sliding the editing interval 30 while holding any one of the first indicator 110 and the second indicator 120.

For example, as illustrated in FIG. 5A, the digital device 10 may receive the third user input 20c of sliding the editing interval 130 while holding the first indicator 110. The partial sequence 3 corresponding to the editing interval 130 includes n frames with respect to a playback duration of t0. In this case, the digital device 10 may reset the second frame corresponding to the second indicator 120 in response to the third user input 20c. Further, the digital device 10 may adjust the thickness of the editing interval 130 based on resetting of the partial sequence 3 including the second frame.

Namely, as shown in FIG. 5B, a user may perform the third user input 20c of sliding the editing interval 130 toward the first indicator 110 while holding the first indicator 110. The digital device 10 receives the third user input 20c and resets the second frame corresponding to the second indicator 120 as 5b1. According to the third user input 20c through which frames are inserted into the partial sequence 3, the partial sequence 3 includes n1 (n1>n) frames, which is greater than the number of frames prior to the third user input 20c, with respect to the same playback duration of t0. In addition, the partial sequence 3 has a faster playback speed than a playback speed prior to the third user input 20c. The digital device 10 of the present invention may enlarge the thickness of the editing interval 130 in order to indicate variation in the playback speed of the partial sequence 3.

On the other hand, a user may perform the third user input 20c of sliding the editing interval 130 to the opposite side of the first indicator 110 while holding the first indicator 110. Then the digital device 10 resets the second frame corresponding to the second indicator 120 as in the embodiment shown in FIG. 3C and may shorten the thickness of the editing interval 130. Moreover, in an embodiment of the present invention, the digital device 10 may receive the third user input of sliding the editing interval 130 while holding the second indicator 120. In this case, the digital device may reset the first frame corresponding to the first indicator 110 and adjust the thickness of the editing interval 130 based on the reset partial sequence including the reset first frame. For a detailed embodiment thereof, reference may be made to the description of FIGS. 5A and 5B.

In this embodiment, upon receiving the user input of sliding the editing interval 139, the digital device 10 may adjust a thickness adjustment scale of the editing interval 130 in proportion to the thickness of the editing interval 130. For example, in the embodiment of FIGS. 3A to 3C, if the third user input 20c of sliding the first interval 132 or the second interval 134 by a length s is received, the number of frames of the video sequence 1 corresponding to the sliding length s may become m. However, in the embodiments of FIGS. 4A to 5B, the number of frames of the video sequence 1 corresponding to the sliding length s with respect to the third user input 20c of sliding the editing interval 130 by the length s may become different. For example, if the thickness of the editing interval 130 is twice the thickness of the timeline interface 100, the number of frames of the video sequence 1 corresponding to the sliding length s of the editing interval 130 may be 2m. Accordingly, the digital device 10 may adjust variation in the thickness of the editing interval 130 in response to the third user input of sliding the editing interval 130 such that it is twice variation in the thickness with respect to the input of sliding the first interval 132 or the second interval 134. If the thickness of the editing interval 130 is ½ times the thickness of the timeline interface 100, the number of frames of the video sequence 1 corresponding to the sliding length s may be (½)m. Therefore, the digital device 10 may adjust variation in the thickness of the editing interval 130 in response to the third user input of sliding the editing interval 130 such that it is ½ times variation in the thickness with respect to the input of sliding the first interval 132 or the second interval 134.

Figure 6:
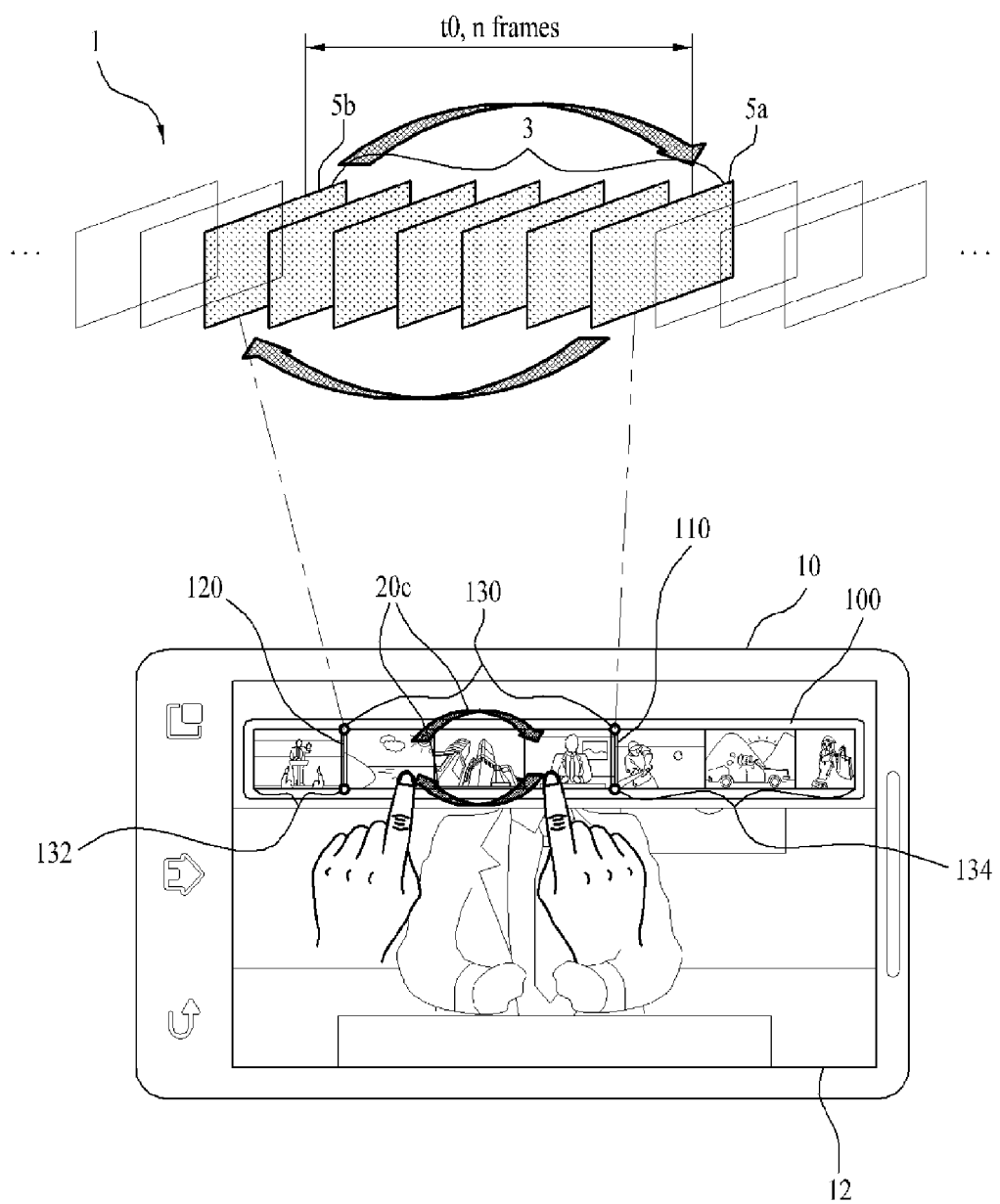

FIG. 6 illustrates another embodiment of the present invention. Referring to FIG. 6, the digital device 10 may reverse the editing interval 130 in response to the third user input 20c for rotating the editing interval 130. FIG. 6 shows a reversed state of the editing interval 130 illustrated in FIG. 5A through the third user input 20c. If the editing interval 130 is reversed, the digital device 10 adjusts the second indicator 120 such that it is adjacent to the first interval 132 of the timeline interface 100 and adjusts the first indicator 110 such that it is adjacent to the second interval 134 of the timeline interface 100. At this time, the digital device 10 may adjust the editing interval 130 after reversing the editing interval 130 so as to have the same thickness and length as before reversing the editing interval 130. The digital device 10 arranges frames of the partial sequence 3 in reverse playback order from the second frame 5b to the first frame 5a. Then the partial sequence 3 includes a reversed playback sequence from the second frame 5b to the first frame 5a. Meanwhile, the playback duration t0 of the reversed partial sequence 3 is the same as the playback time t0 of the partial sequence 3 prior to reversing the editing interval shown in FIG. 5A. That is, the reversed partial sequence 3 reversely plays n frames during a duration t0.

FIGS. 7A to 8C illustrate a video editing method according another embodiment of the present invention. According to the embodiment of the present invention of FIGS. 7A to 8C, the digital device 10 may perform video editing in response to a user input of sliding at least one of the first indicator 110 and the second indicator 120. More specifically, the digital device 10 may receive an input of sliding at least one of the first indicator 110 and the second indicator 120, adjust at least one of the thickness and length of the editing interval 130, and edit the playback attributes of the partial sequence 3.

FIGS. 7A to 7E illustrate an embodiment for performing video editing in response to a user input of sliding any one of the first indicator 110 or the second indicator 120. Hereinafter, a method through which the digital device 10 performs video editing in response to the third user input 20c of sliding the second indicator 120 will be described with reference to FIGS. 7A to 7E. The digital device 10 according to the embodiment of the present invention may perform video editing using the same or corresponding method even in response to the third user input of sliding the first indicator 110.

Figure 7A:
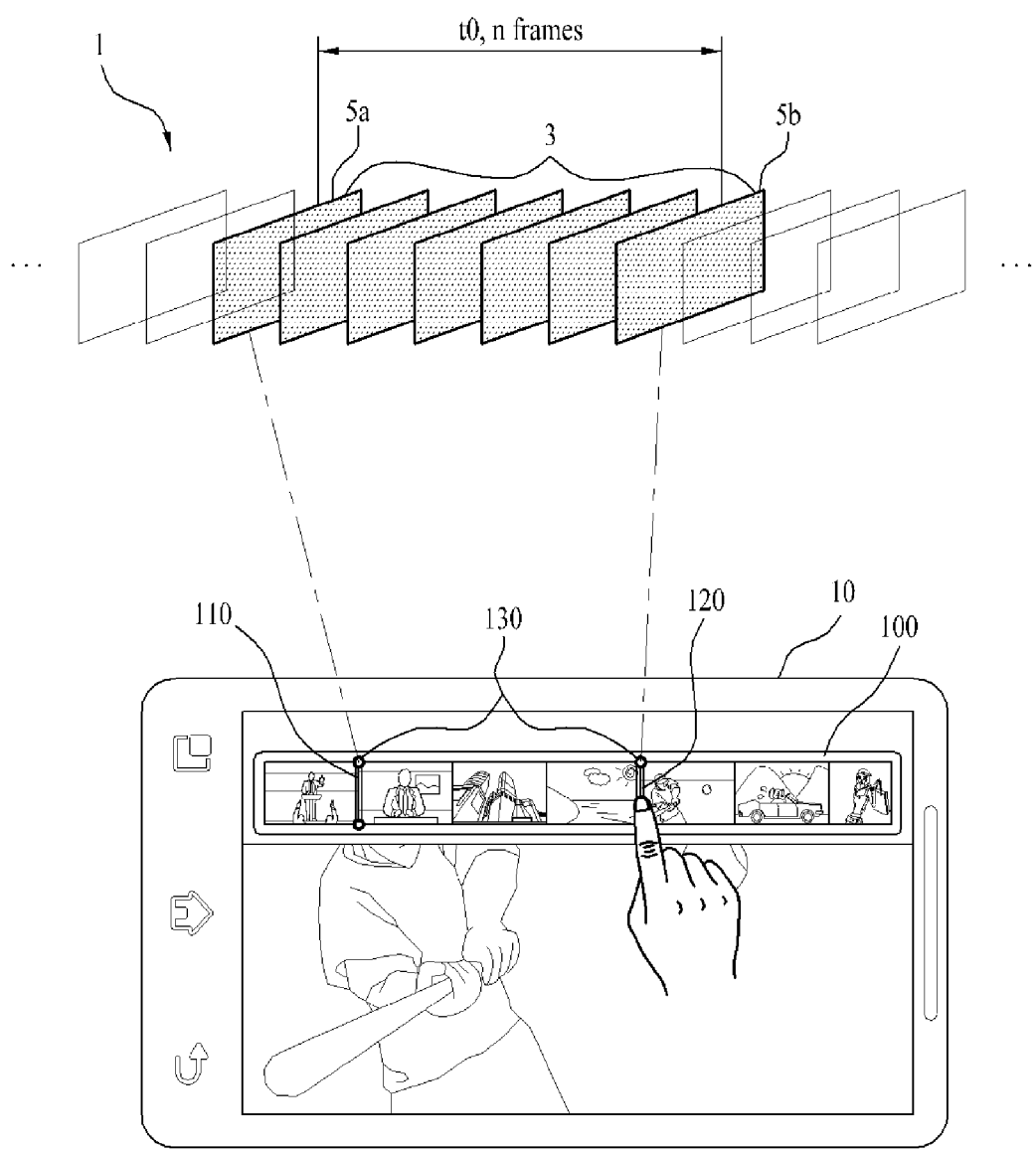
FIGS. 7 and 8 are diagrams illustrating a video editing method according to another embodiment of the present invention.

As illustrated in FIG. 7A, if the first frame 5a and the second frame 5b are set by a first user input and a second user input, n frames between the first frame 5a and the second frame 5b constitute the partial sequence 3 having a playback duration of t0. The digital device 10 according to the present embodiment may receive the third user input 20c of sliding the second indicator 120, adjust the editing interval 130, and edit the playback attributes of the partial sequence 3. Here, the digital device 10 adjusts the playback speed and playback duration of the partial sequence 3 while maintaining the number of frames of the partial sequence 3 at n.

Figure 7B:
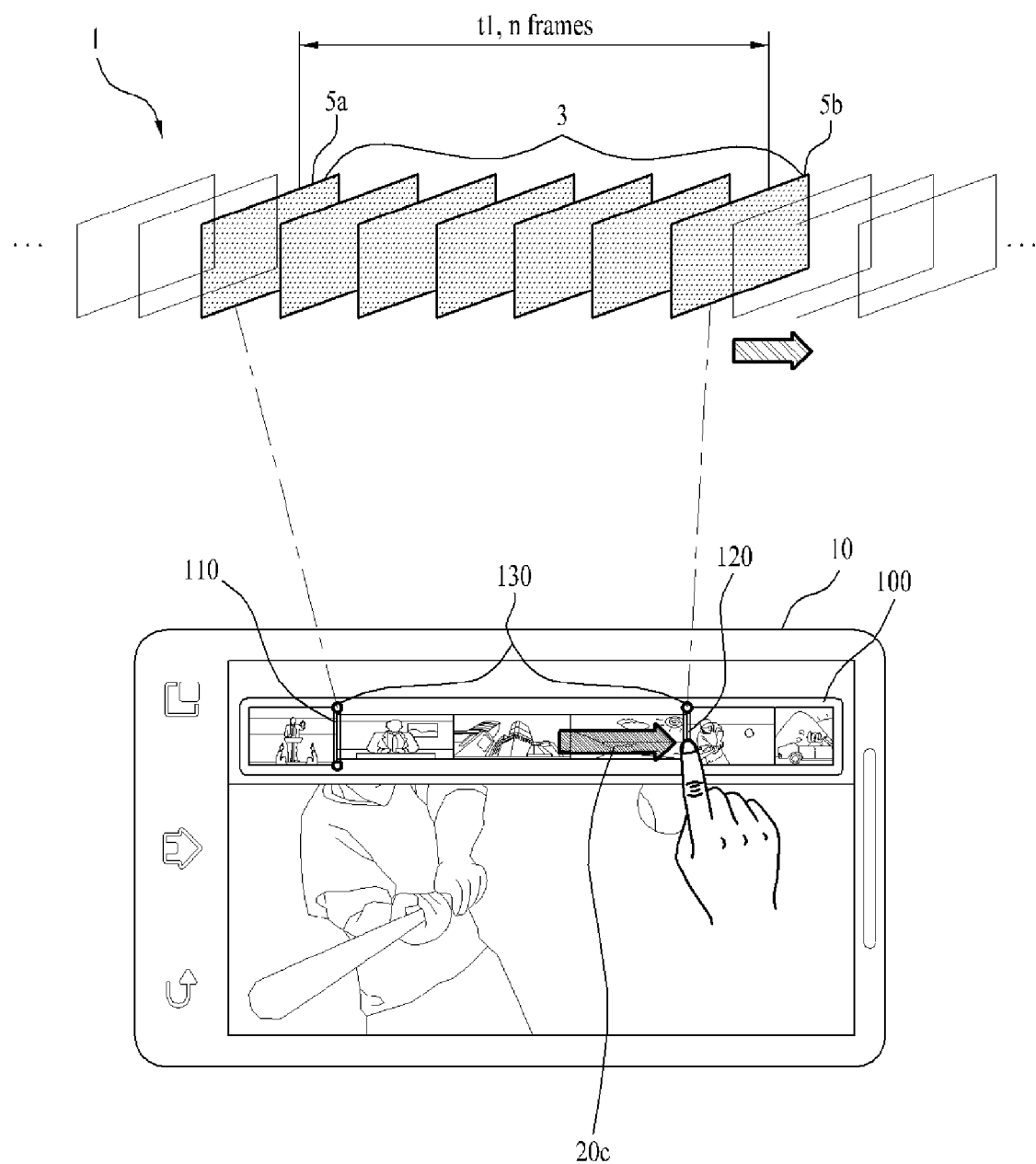
Figure 7C:
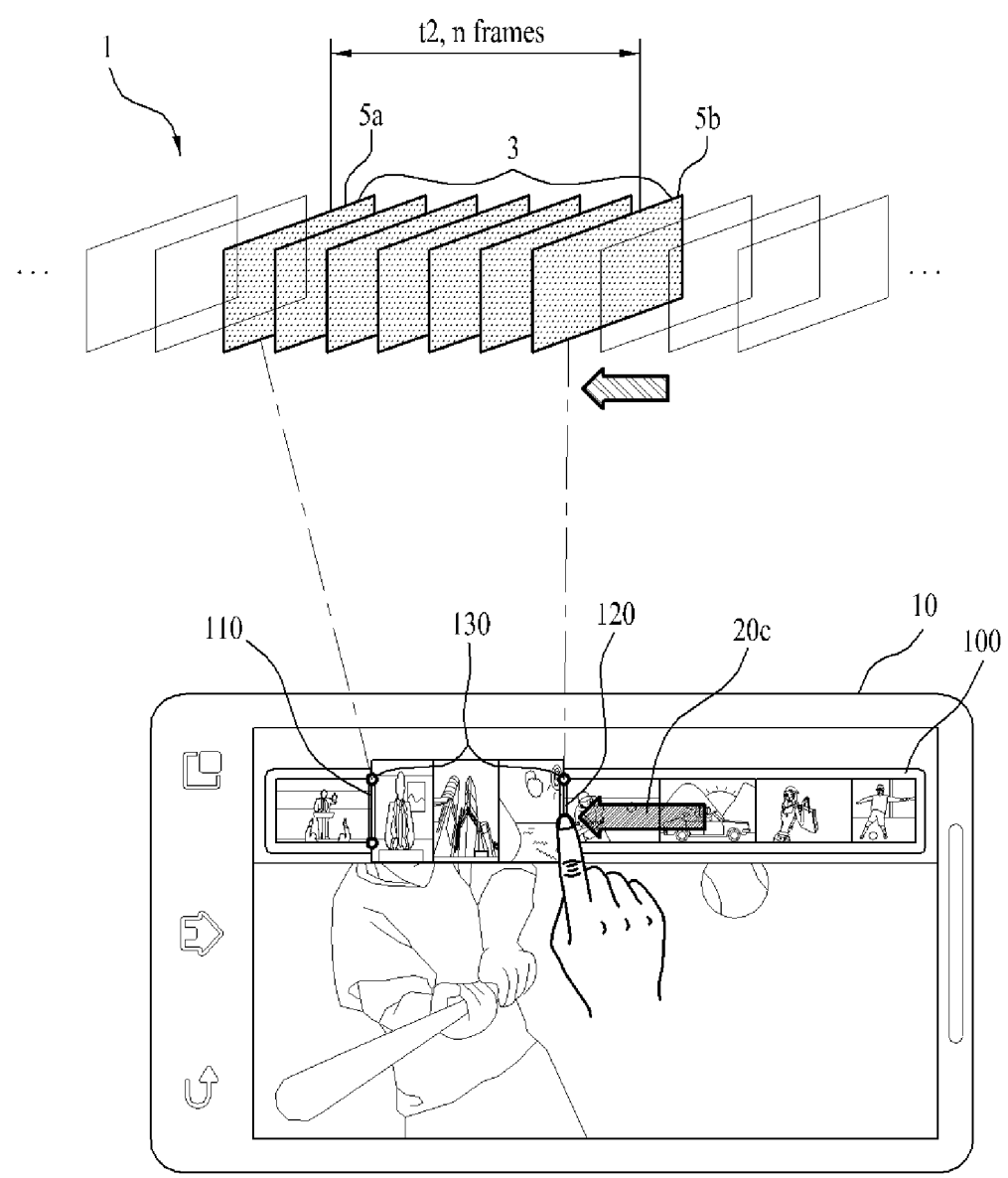

FIG. 7B shows the user input 20c of sliding the second indicator 120 toward the opposite side of the first indicator 110. FIG. 7C shows the user input 20c of sliding the second indicator 120 toward the first indicator 110.

If the distance between the first indicator 110 and the second indicator 120 become longer by the third user input 20c as illustrated in FIG. 7B, the length of the editing interval 130 is enlarged. The length of the editing interval 130 is proportional to the playback duration of the partial sequence 3. Accordingly, the playback duration of the partial sequence 3 is changed to t1 which is longer than the prior playback duration t0. Since the partial sequence 3 includes the n frames which is the same as the number of frames prior to the third user input 20c, the partial sequence 3 has a slower playback speed than a playback speed prior to the third user input 20c. The digital device 10 of the present invention reduces the thickness of the editing interval 130 in order to indicate variation in the playback speed of the partial sequence 3. The thickness of the editing interval 130 may be reduced in proportion to the playback speed of the partial sequence 3.

In contrast, if the distance between the first indicator 110 and the second indicator 120 becomes shorter by the third user input 20c as illustrated in FIG. 7C, the length of the editing interval 130 is shortened. Accordingly, the playback duration of the partial sequence 3 is changed to t2 which is shorter than the playback duration t0. Since the partial sequence 3 includes the n frames, the partial sequence 3 has a faster playback speed than the playback speed prior to the third user input 20c. The digital device 10 of the present invention enlarges the thickness of the editing interval 130 in order to indicate variation in the playback speed of the partial sequence 3. The thickness of the editing interval 130 may be enlarged in proportion to the playback speed of the partial sequence 3.

Figure 7D:
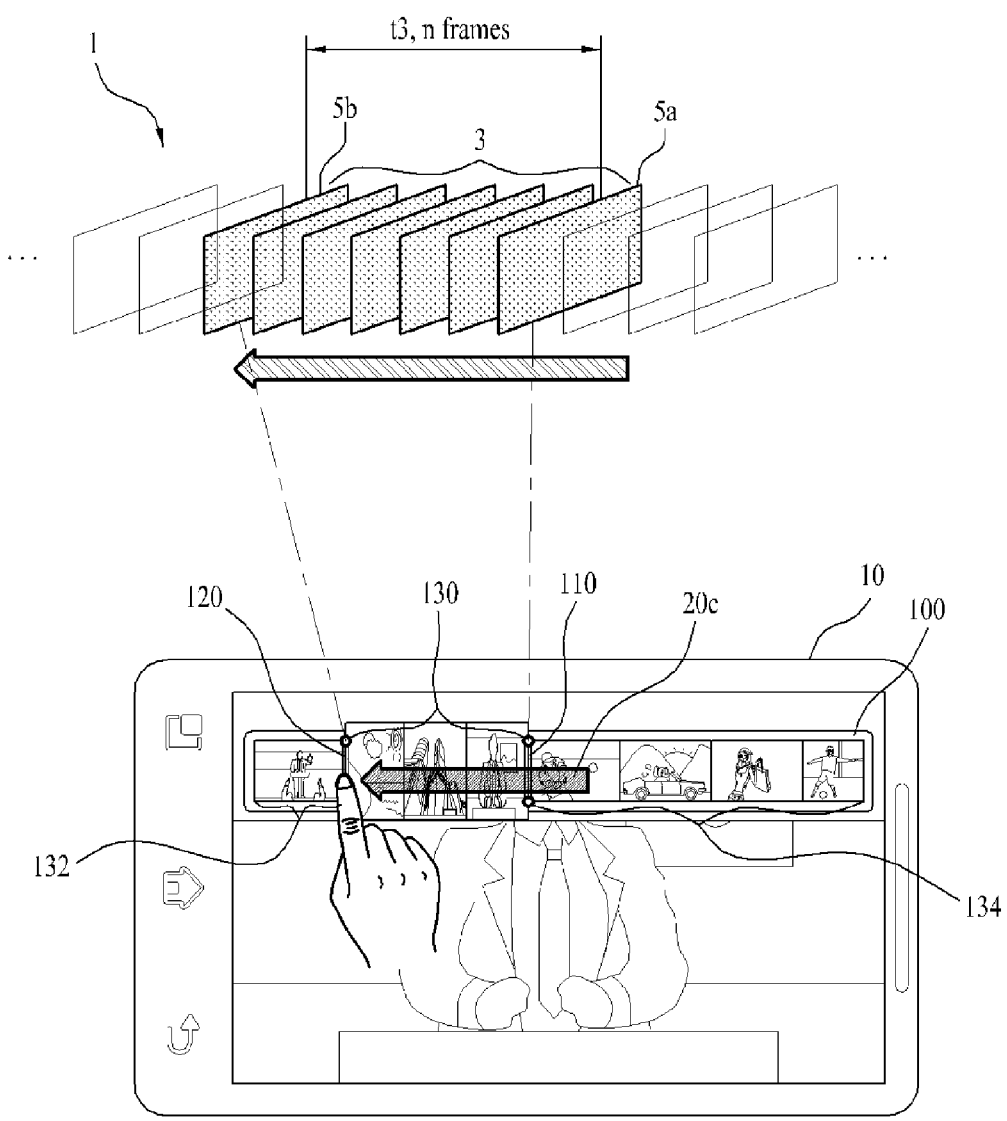

FIG. 7D illustrates another embodiment of the present invention. Referring to FIG. 7D, positions of the first indicator 110 and the second indicator 120 may be interchanged by the third user input 20c of sliding any one of the first indicator 110 or the second indictor 120. If the positions of the first and second indicators 110 and 120 are interchanged with each other, the digital device 10 adjusts the second indicator 120 such that it is adjacent to the first interval 132 of the timeline interface 100 and adjusts the first indicator 110 such that it is adjacent to the second interval 134 of the timeline interface 100. In addition, the digital device 10 reversely arranges playback order of frames of the partial sequence 3 from the second frame 5b to the first frame 5a. Then the partial sequence 3 configures a reversed playback sequence from the second frame 5b to the first frame 5a. Meanwhile, a playback duration t3 of the reversed partial sequence 3 is determined based on the distance between the interchanged first and second indicators 110 and 120. The playback speed of the partial sequence 3 is a speed at which n frames are played back during the duration of t3. The digital device 10 adjusts the thickness of the editing interval 130 such that it is proportional to the playback speed of the partial sequence 3.

Figure 7E:
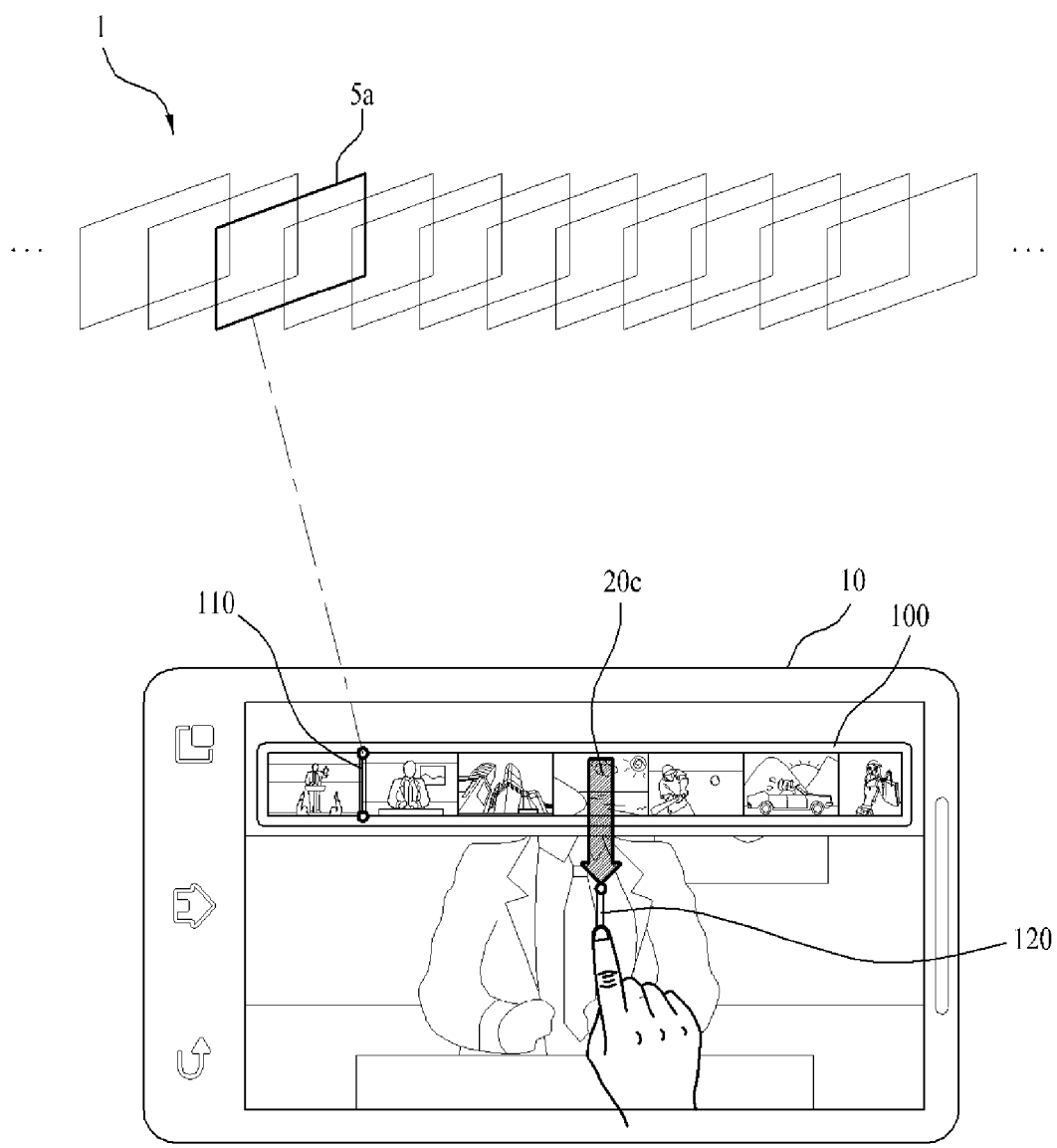

FIG. 7E illustrates still another embodiment of the present invention in which the digital device 10 may provide an interface for deleting at least one of the first indicator 110 and the second indicator 120. For example, the digital device 10 may provide a button for deleting each of the first indicator 110 and the second indicator 120. Alternatively, the digital device 10 may delete the first indicator 110 or the second indicator 120 in response to a preset user input. In the embodiment of FIG. 7E, the digital device 10 may delete the first indicator 110 or the second indicator 120 in response to the third user input 20c for extracting the first indicator 110 or the second indicator 120 from the timeline interface 100. As shown in FIG. 7E, if the second indictor 120 is deleted from the timeline interface 100 by the third user input 20c, the digital device 10 may release the setting of the editing interval between the first indicator 110 and the second indicator 120. In addition, the digital device 10 may release the setting of the second frame corresponding to the second indicator 120 and may also release the setting of the partial sequence between the first frame 5a and the released second frame. If the thickness of the released editing interval has been adjusted from the basic thickness of the timeline interface 100, the digital device 10 may restore the thickness of the corresponding editing interval to the basic thickness of the timeline interface 100. The digital device may also restore the playback speed of the released partial sequence to the basic playback speed of the video sequence 1.

Figure 8A:
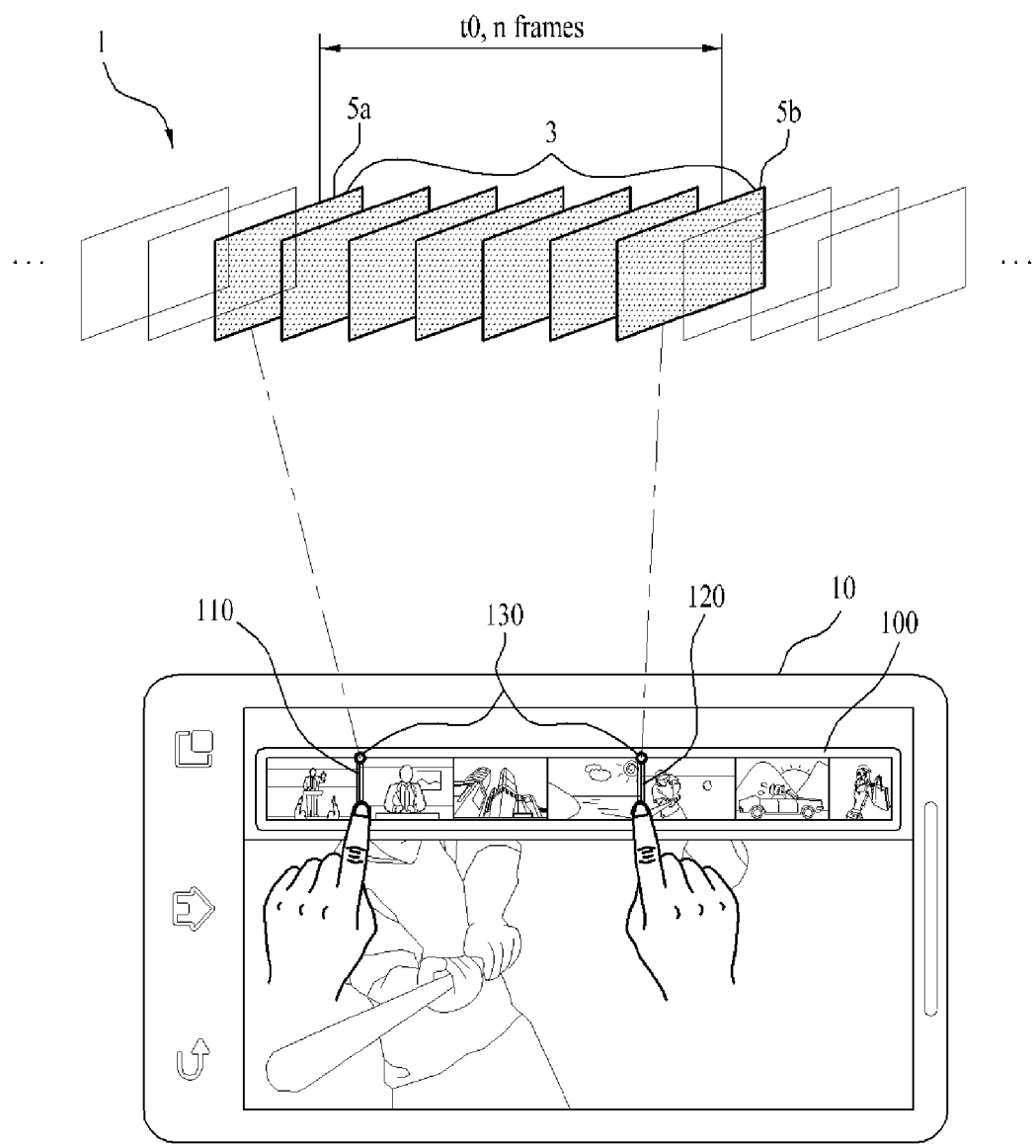
Figure 8B:
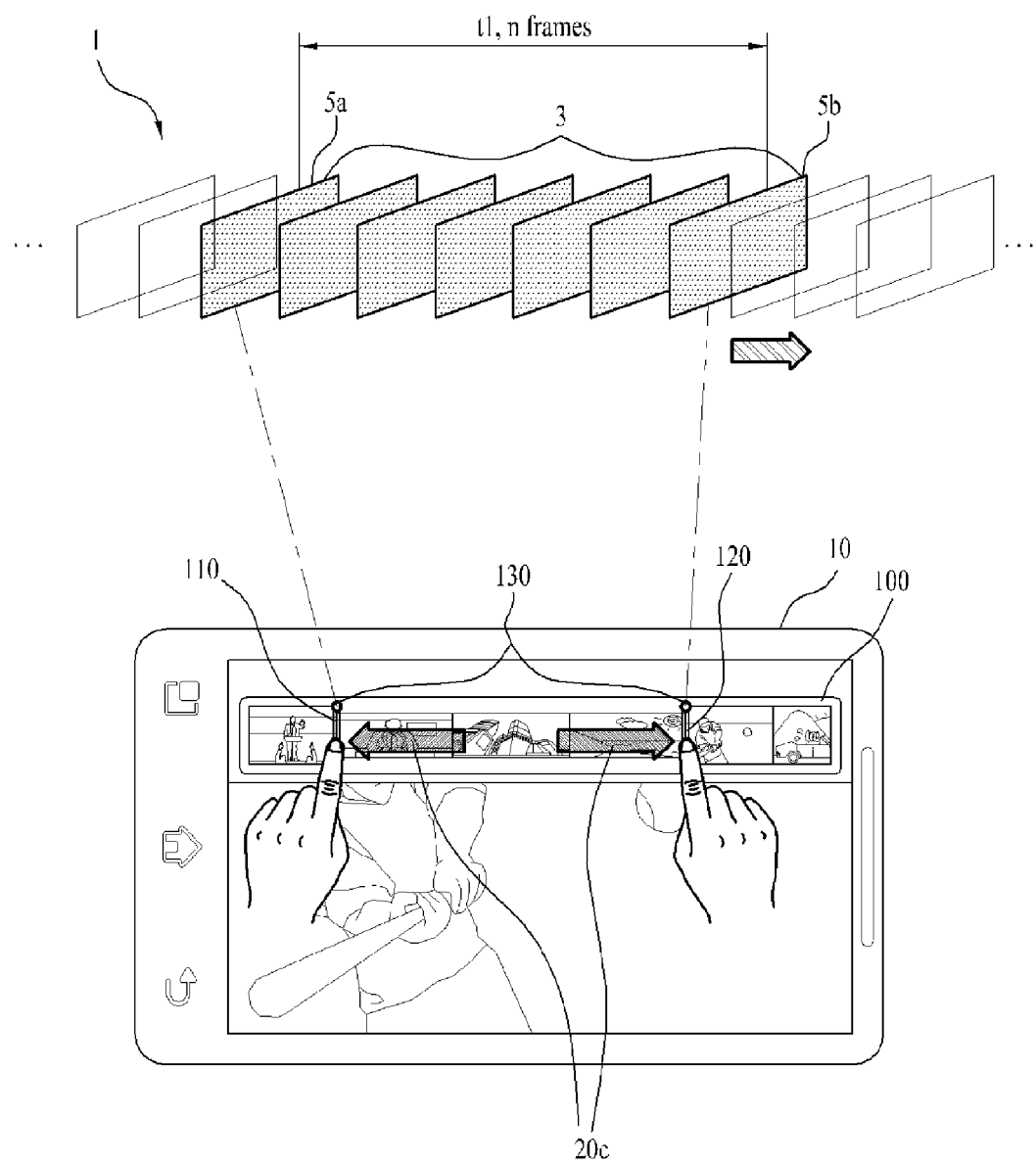
Figure 8C:
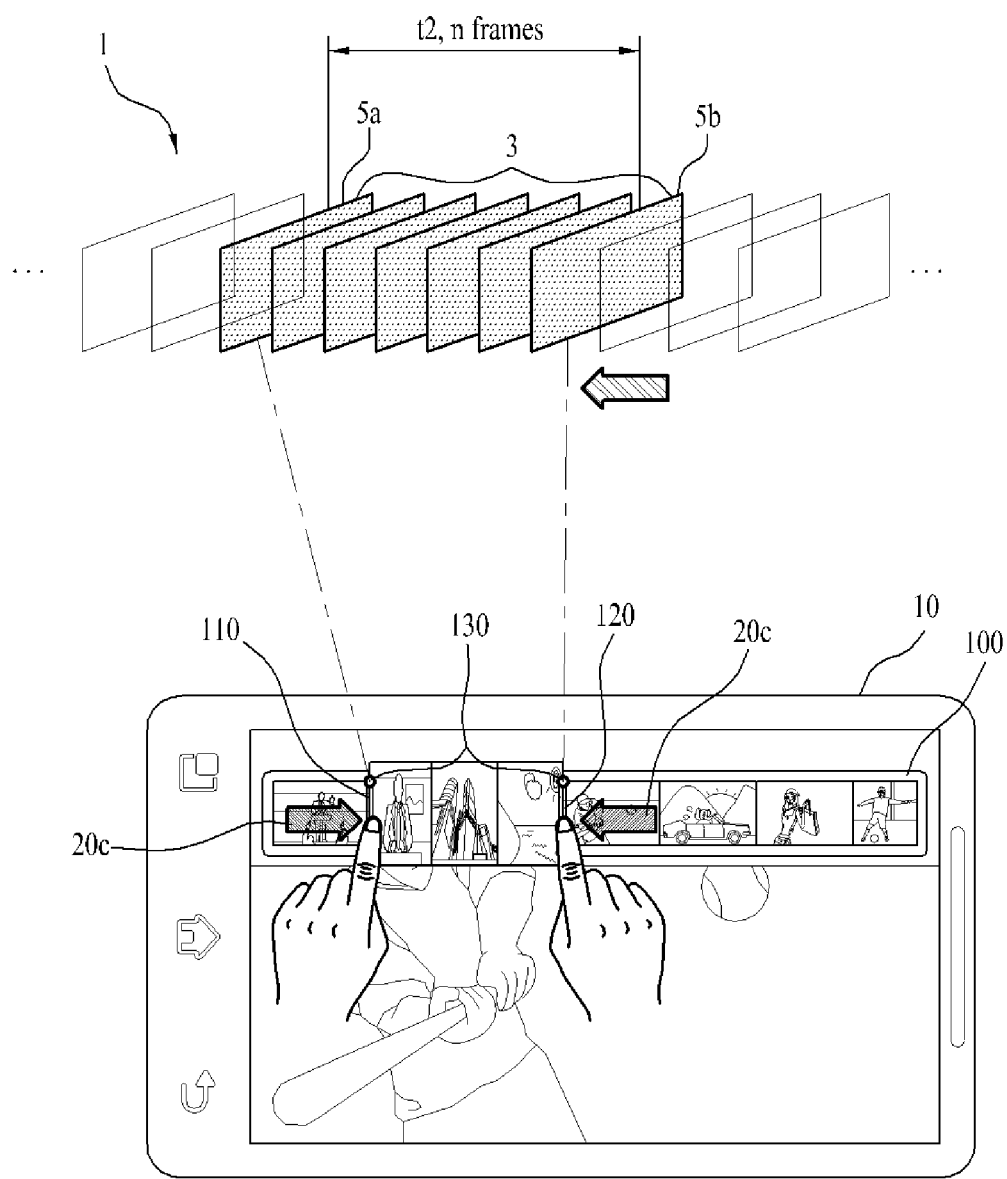

Next, FIGS. 8A to 8C illustrate an embodiment in which the digital device 10 performs video editing in response to a user input of sliding both the first indicator 110 and the second indicator 120. As shown in FIG. 8A, if the partial sequence 3 including n frames is set between the first frame 5a and the second frame 5b and the editing interval 130 corresponding to the partial sequence 3 is set on the timeline interface 100, the digital device 10 may receive the third user input 20c of sliding both the first indicator 110 and the second indicator 120. The digital device 10 adjusts the playback speed and playback duration of the partial sequence 3 while maintaining the number of frames of the partial sequence 3 at n.

If the distance between the first indicator 110 and the second indicator 120 becomes longer by the third user input 20c as illustrated in FIG. 8B, the length of the editing interval 130 is enlarged. In this case, the playback duration of the partial sequence 3 is changed to t1 which is longer than a prior playback duration t0. Since the playback speed of the partial sequence is decreased, the digital device 10 reduces the thickness of the editing interval 130. For a detailed description thereof, reference may be made to the description of FIG. 7B.

In contrast, if the distance between the first indicator 110 and the second indicator 120 becomes shorter by the third user input 20c as illustrated in FIG. 8C, the length of the editing interval 130 is shortened. At this time, the playback duration of the partial sequence 3 is changed to t2 which is shorter than the playback duration t0. Since the playback speed of the partial sequence 3 is increased, the digital device 10 enlarges the thickness of the editing interval 130. For a detailed description thereof, reference may be made to the earlier description of FIG. 7C.

Figure 9A:
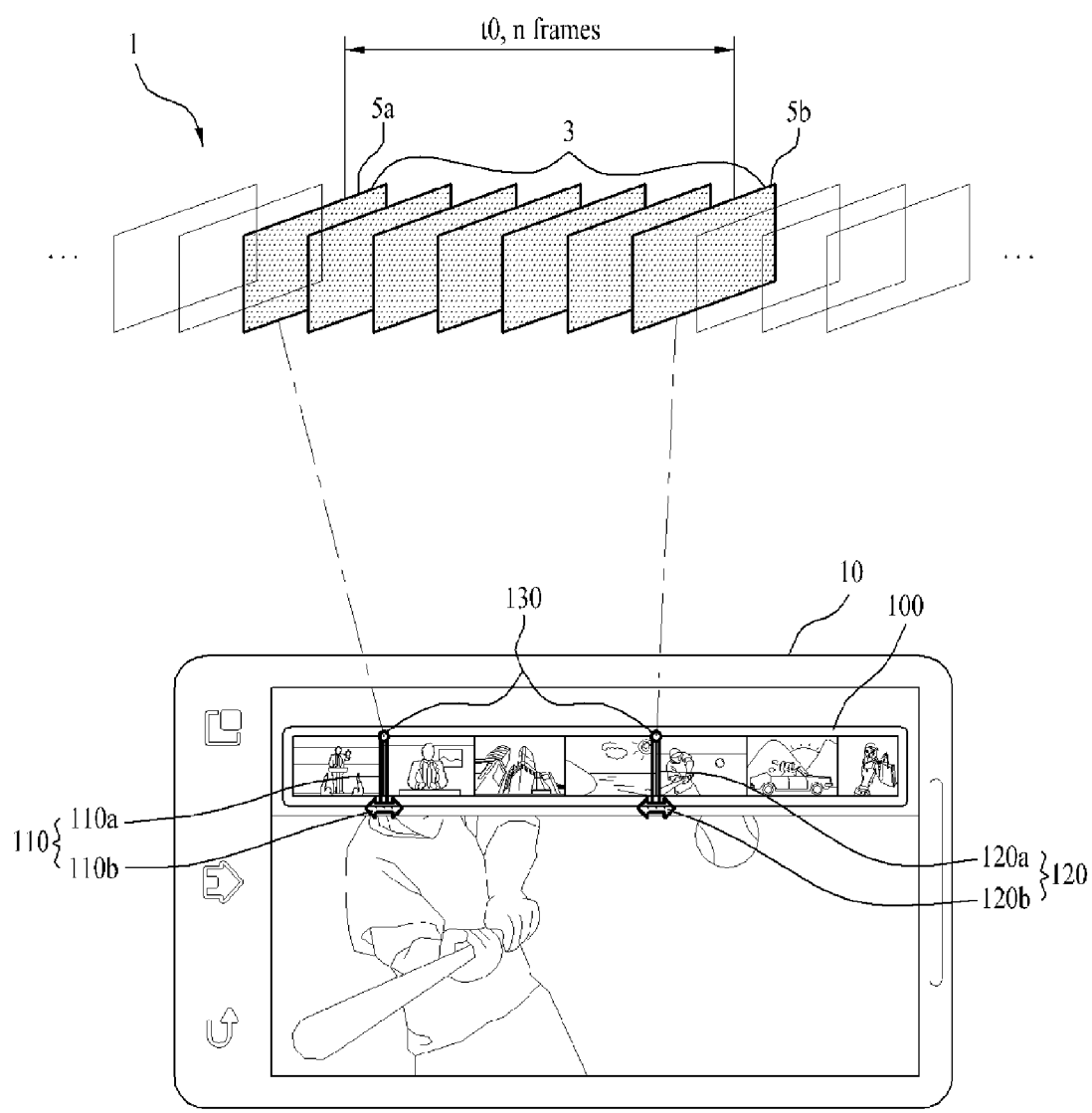
FIGS. 9A to 9D are diagrams illustrating a video editing method using first and second indicators according to an embodiment of the present invention.

FIGS. 9A to 9D illustrate a video editing method according to another embodiment of the present invention. As shown in FIG. 9A, the first indicator 110 and the second indicator 120 according to the embodiment of the present invention may include body parts 110a and 120a and adjustment parts 110b and 120b, respectively. The adjustment parts 110b and 120b are interfaces for performing additional functions of the corresponding indicators 110 and 120 and location shifting thereof is possible on the timeline interface 100 by a user input. In this embodiment, location shifting indicates that a target object for location shifting is independently shifted on the timeline interface 100. Namely, even if the location of the target object on the timeline interface 100 is shifted by a user input, the other objects on the timeline interface 100 except for the target object are not shifted. In the embodiment of the present invention, a location shifting input may be performed in various ways as described earlier, such as touch and drag, click and drag, point moving, direction switching interface (e.g. direction switching key) input, and preset gesture according to the type of a user input. Meanwhile, the adjustment parts 110b and 120b may constitute parts of the corresponding indicators 110 and 120 together with the corresponding body parts 110a and 120a or may be interfaces which are additionally provided to the corresponding indicators 110 and 120.

Figure 9B:
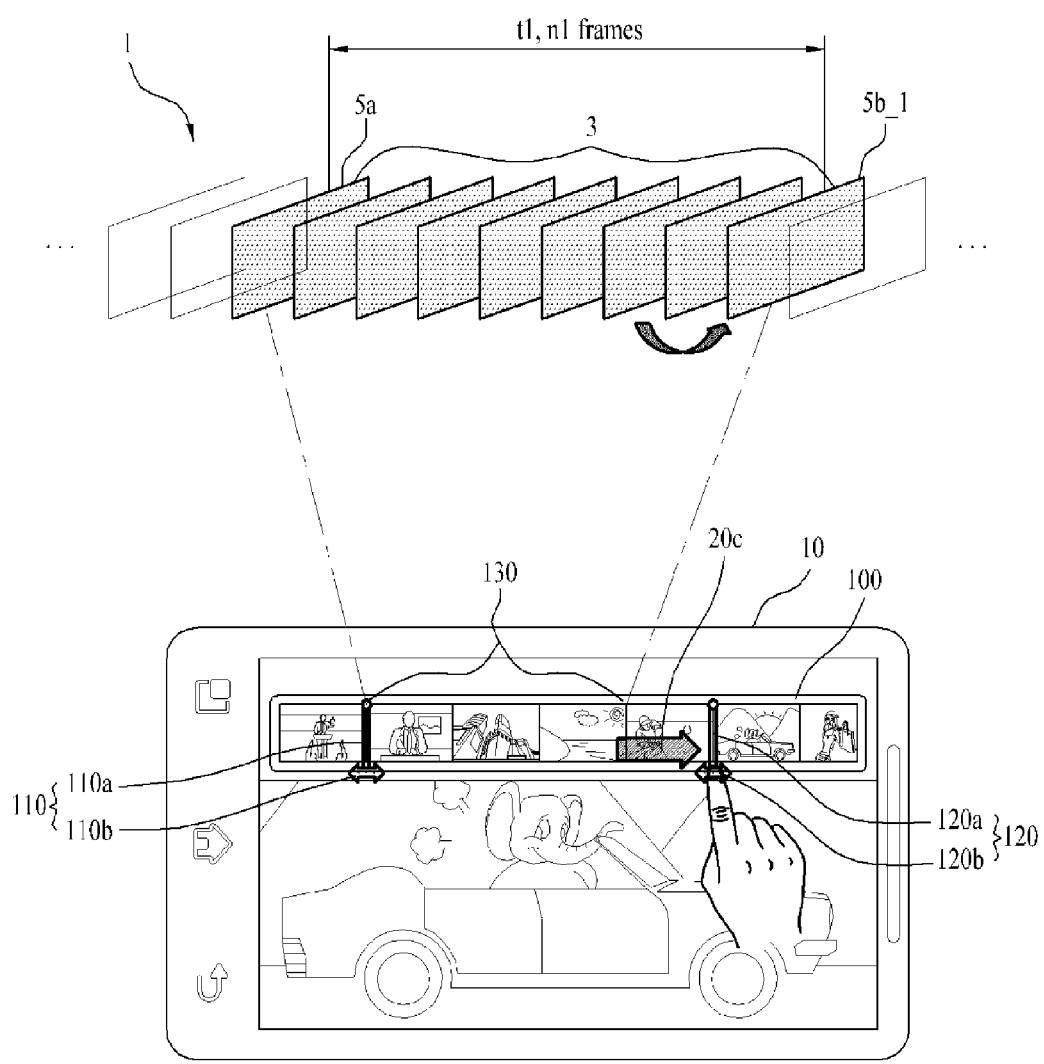
Figure 9C:
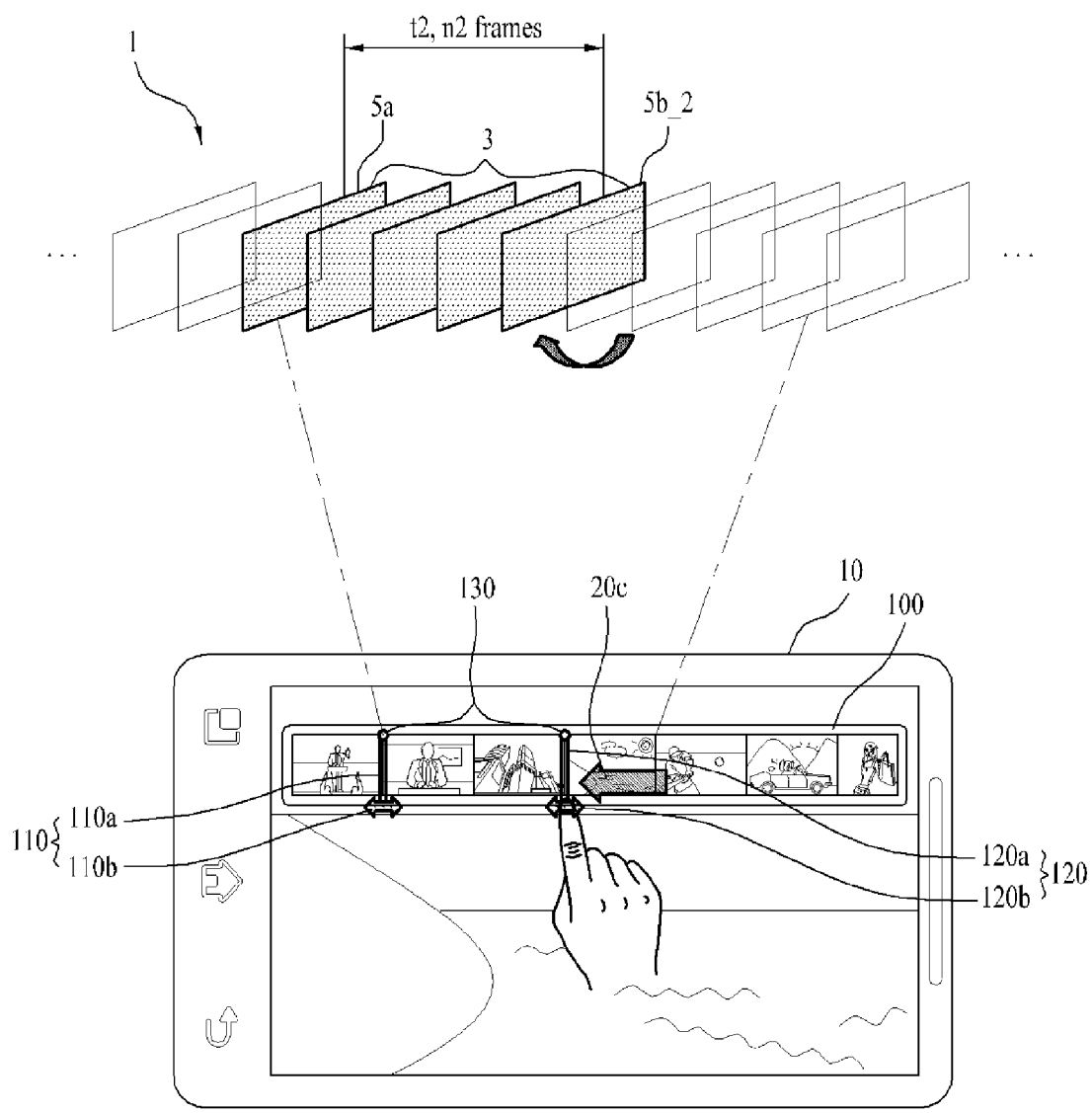

FIGS. 9B and 9C illustrate an embodiment in which the digital device 10 performs video editing based on the third user input 20c for shifting the location of at least one of the adjustment part 110b of the first indicator 110 and the adjustment part 120b of the second indicator 120. In the present embodiment, the digital device 10 may reset the editing interval 130 and the partial sequence 3 corresponding to the editing interval 130 based on the location shifting of the adjustment parts 110b and 120b. That is, the digital device 10 may reset the first frame 5a corresponding to the first indicator 110 based on the location shifting of the adjustment part 110b and reset the second frame 5b corresponding to the second indicator 120 based on the location shifting of the adjustment part 120b. In this case, the digital device 10 may shift the first indictor 110 in correspondence to the location shifting of the adjustment part 110b and shift the second indicator 120 in correspondence to the location shifting of the adjustment part 120b.

More specifically, if the second indicator 120 is distant from the first indicator 110 by the location shifting of the adjustment part 120b of the second indicator 120 as shown in FIG. 9B, the second frame corresponding to the second indicator 120 is reset as 5b1. Then, the partial sequence 3 includes n1 (n1>n) frames and the playback duration of the partial sequence 3 is increased to t1 (t1>t0). In spite of the location shifting of the second indicator 120, the playback speed of the partial sequence 3 does not vary. Since the playback speed of the partial sequence 3 is constant although the length of the editing interval 130 is enlarged in correspondence to the increased playback duration t1 of the partial sequence 3, the thickness of the editing interval 130 can be kept constant.

In contrast, as illustrated in FIG. 9C, if the second indicator 120 becomes near to the first indicator 110 by the location shifting of the adjustment part 120b of the second indicator 120, the second frame corresponding to the second indicator 120 is reset to 5b_2. Then, the partial sequence 3 includes n2 (n2<n) frames and the playback duration of the partial sequence 3 is reduced to t2 (t2<t0). In spite of the location shifting of the second indicator 120, the playback speed of the partial sequence 3 does not vary. Since the playback speed of the partial sequence 3 is constant although the length of the editing interval 130 is shortened in correspondence to the decreased playback duration t2 of the partial sequence 3, the thickness of the editing interval 130 can be kept constant.

Figure 9D:
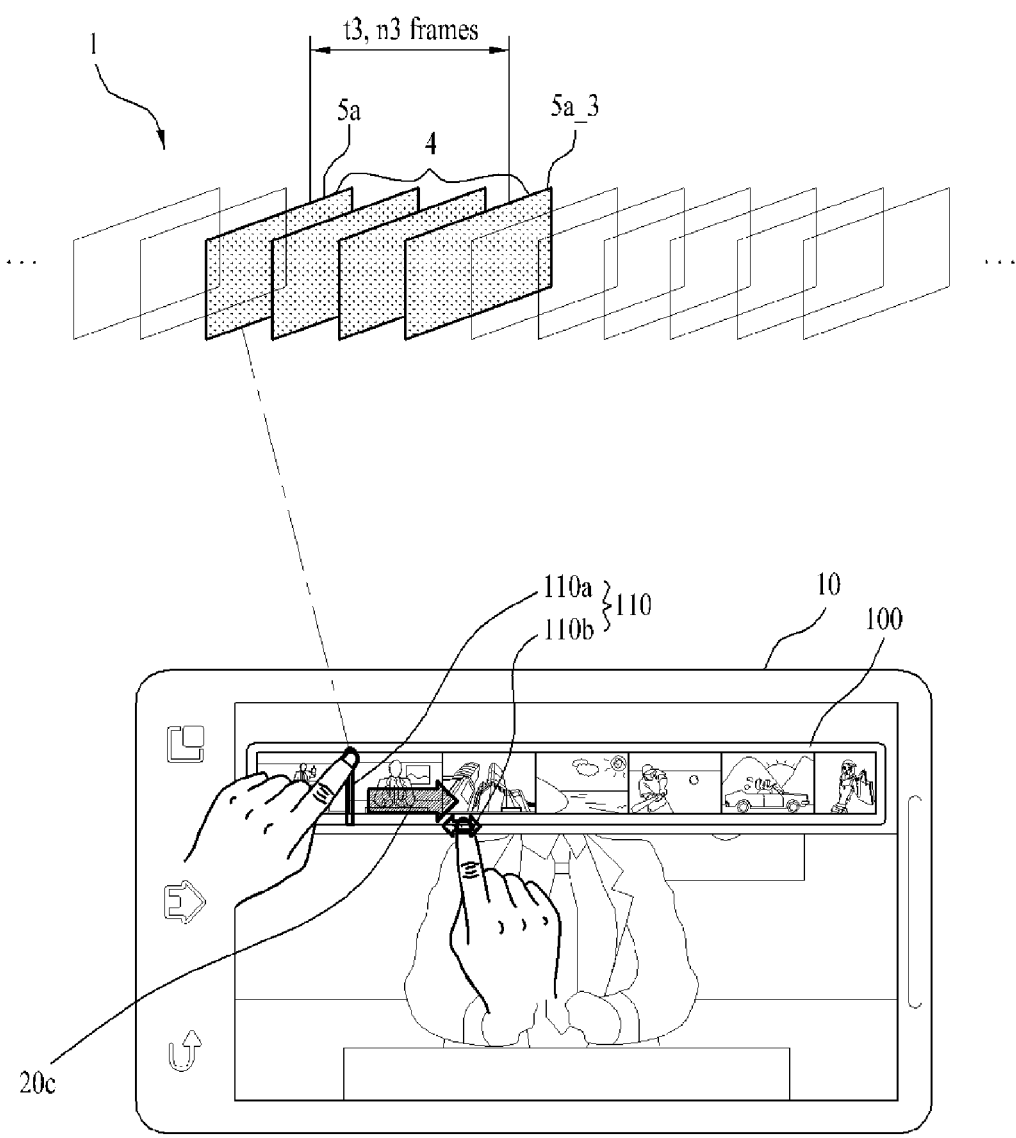

On the other hand, FIG. 9D illustrates an embodiment in which the digital device 10 performs video editing based on the third user input 20c for shifting an adjustment part while holding a body part of an indicator. In this embodiment, the digital device may generate freeze frames 4 of the frames 5a and 5b corresponding to the corresponding indicators 110 and 120. That is, the digital device 10 may generate a freeze frame 4 of the first frame 5a in response to the third user input 20c for shifting the location of the adjustment part 110b while holding the body part 110a and generate a freeze frame 4 of the second frame 5b in response to the third user input 20c for shifting the location of the adjustment part 120b while holding the body part 120a. In this case, the playback duration of the freeze frame 4 of the first frame 5a may be determined based on the displacement of the adjustment part 110b of the first indicator 110 and the playback duration of the freeze frame 4 of the second frame 5b may be determined based on the displacement of the adjustment part 120b of the second indicator 120.

More specifically, if the location of the adjustment part 110b of the first indicator 110 is shifted while holding the location of the body part 110a of the first indicator 110 as illustrated in FIG. 9D, the digital device 10 generates the freeze frame 4 of the first frame 5a. The playback duration of the freeze frame 4 of the first frame 5a is determined based on the shifted displacement of the adjustment part 110b and the digital device 10 inserts the freeze frame 4 of the first frame 5a into an area in which the first frame 5a of the partial sequence 3 is located. In FIG. 9D, the digital device 10 generates n3 freeze frames 4 from the frame 5a to a frame 5a_3 based on the displacement of the adjustment part 110b and the playback duration of the freeze frame 4 is t3.

In the embodiment of the present invention, the digital device 10 may generate the freeze frames 4 of the indicators 110 and 120 in response to the third user input 20c of FIG. 9D irrespective of whether the editing interval 130 has been set on the timeline interface 100. Meanwhile, the digital device 10 may assign a display effect indicating freeze frames 4 in an interval on the timeline interface 100 corresponding to an interval of the video sequence 1 in which the freeze frames 4 are generated. For example, the digital device 10 may differently adjust at least one of color, brightness, transparency, and pattern of a corresponding interval on the timeline interface 100 from the other intervals. Alternatively, the digital device 10 may adjust the length of a first axis direction of an indicator at which the third user input 20c of FIG. 9D is received such that it has a length covering an interval between the body part and adjustment part of the corresponding indicator.

Figure 10A:
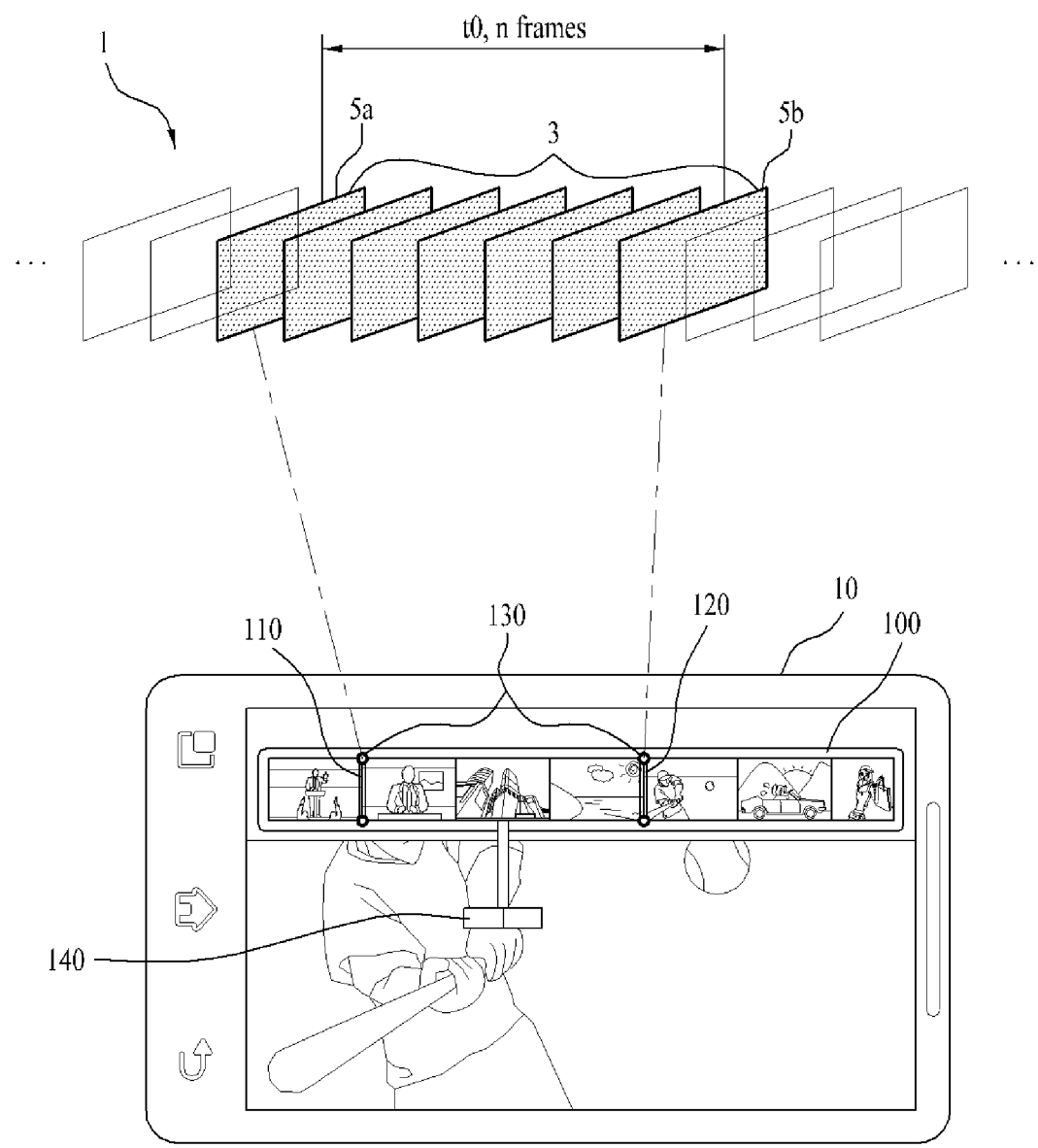
FIGS. 10A to 10C are diagrams illustrating a video editing method according to still another embodiment of the present invention.
Figure 10B:
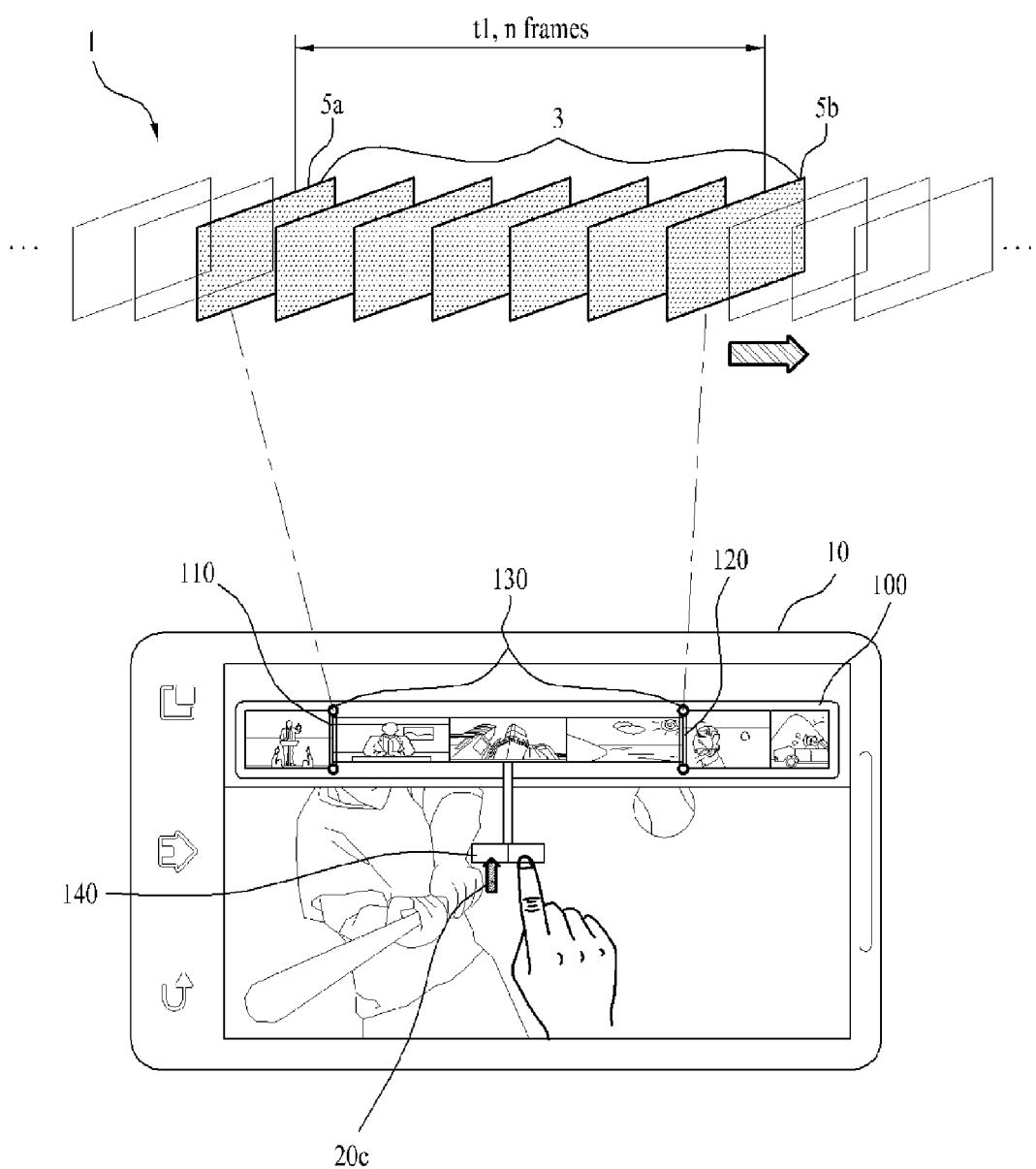
Figure 10C:
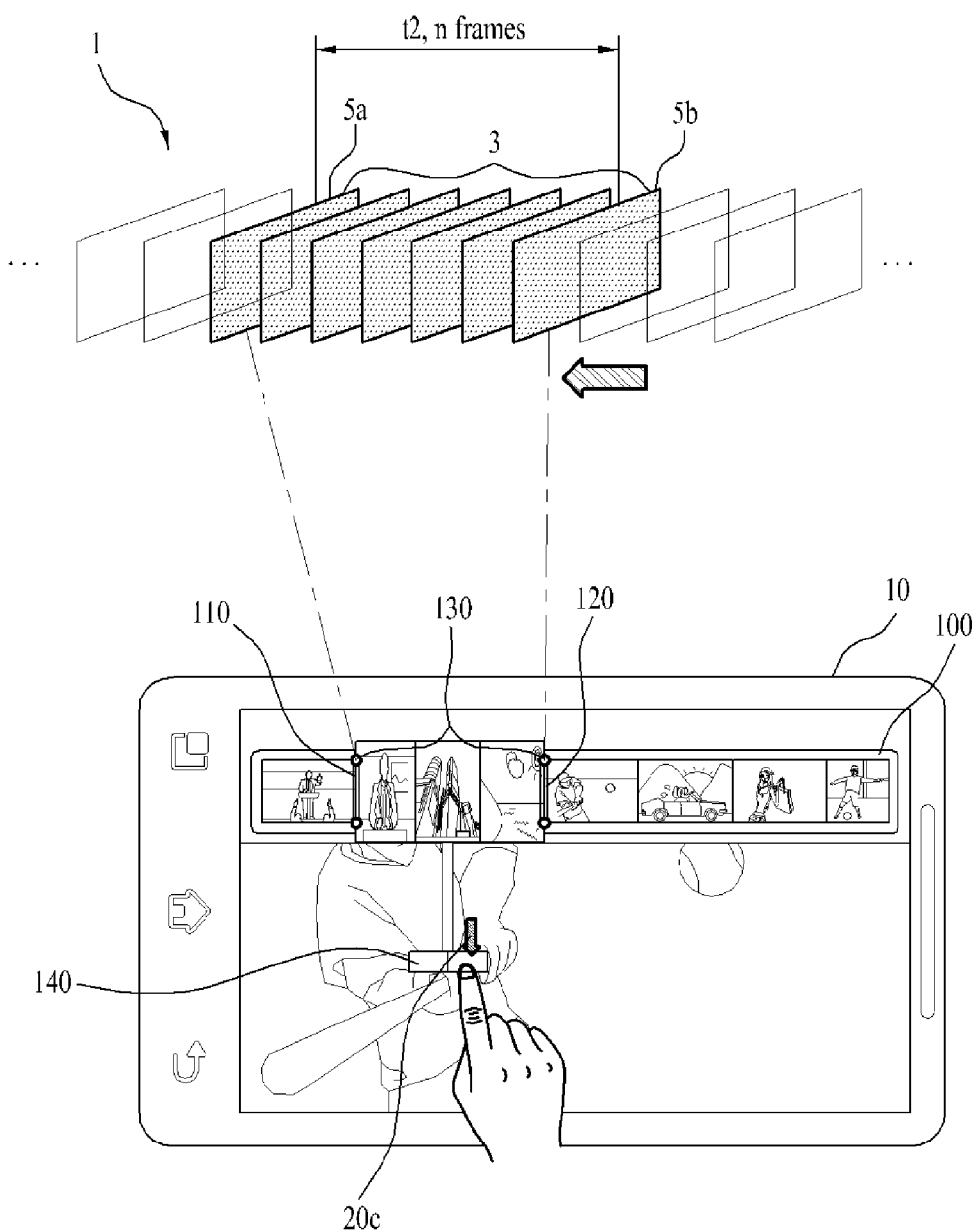

FIGS. 10A to 10C illustrate a further embodiment in which the digital device 10 provides a handle interface 140 for adjusting the playback attributes of the partial sequence 3.

First, as illustrated in FIG. 10A, if the editing interval 130 corresponding to the partial sequence 3 including the first frame 5a and the second frame 5b is set on the timeline interface 100, the digital device 10 may provide the handle interface 140 which can adjust the thickness of the editing interval 130. The handle interface 140 is connected to the editing interval 130 and can be slid in the direction of the thickness of the timeline interface 100. The digital device 10 receives the third user input 20c of sliding the handle interface 140 and adjusts the thickness and length of the editing interval 130 based on the third user input 20c. In addition, the digital device 10 adjusts the playback speed and playback duration of the partial sequence 3 while maintaining the number of frames of the partial sequence 3 at n.

More specifically, as illustrated in FIG. 10B, if the handle interface 140 moves toward the timeline interface 100 by the third user input 20c, the thickness of the editing interval 130 is reduced. The digital device 10 enlarges the length of the editing interval 130 in correspondence to the reduced thickness of the editing interval 130. In this case, the digital device 10 may enlarge the length of the editing interval 130 in inverse proportion to the reduced thickness of the editing interval 130. Further, the digital device 10 changes the playback duration of the partial sequence 3 to t1, which is longer than a prior playback duration t0, in correspondence to the enlarged length of the editing interval 130. Accordingly, the playback speed of the partial sequence 3 becomes slow in proportion to the reduced thickness of the editing interval 130.

On the contrary, as illustrated in FIG. 10C, if the handle interface 140 moves toward the opposite side of the timeline interface 100, the thickness of the editing interval 130 is enlarged. The digital device 10 shortens the length of the editing interval 130 in correspondence to the enlarged thickness of the editing interval 130. In this case, the digital device 10 may shorten the length of the editing interval 130 in inverse proportion to the enlarged thickness of the editing interval 130. Further, the digital device 10 changes the playback duration of the partial sequence 3 to t2, which is shorter than the prior playback duration t0, in correspondence to the shortened length of the editing interval 130. Accordingly, the playback speed of the partial sequence 3 becomes fast in proportion to the enlarged thickness of the editing interval 130.

Meanwhile, according to another embodiment of the present invention, if the handle interface 140 is spaced by a preset distance or more from the timeline interface 100 by the third user input 20c, the digital device 10 may delete or separate the editing interval 130 on the timeline interface 100. Alternatively, if the handle interface 140 is distant from the timeline interface 100 at a preset rate or more by the third user input 20c, the digital device 10 may delete or separate the editing interval 130 on the timeline interface 100. If the editing interval 130 is deleted or separated from the timeline interface 100, the digital device 10 may delete the partial sequence 3 corresponding to the editing interval 130 from the video sequence.

According to the present embodiment, a user can conveniently adjust the editing interval 130 using the handle interface 140. Especially, even when the entire length of the editing interval 130 exceeds an area displayed on the digital device 10 according to the enlarged length of the editing interval 130, a user can easily adjust the length of the editing interval 130 using the handle interface 140. If the distance between the first indicator 110 and the second indicator 120 becomes very short according to the shortened length of the editing interval 130, it is difficult to adjust the length of the editing interval 120 using the first indicator 110 or the second indicator 120. At this time, a user may use the handle interface 140 to minutely adjust the length of the editing interval 130.

Figure 11A:
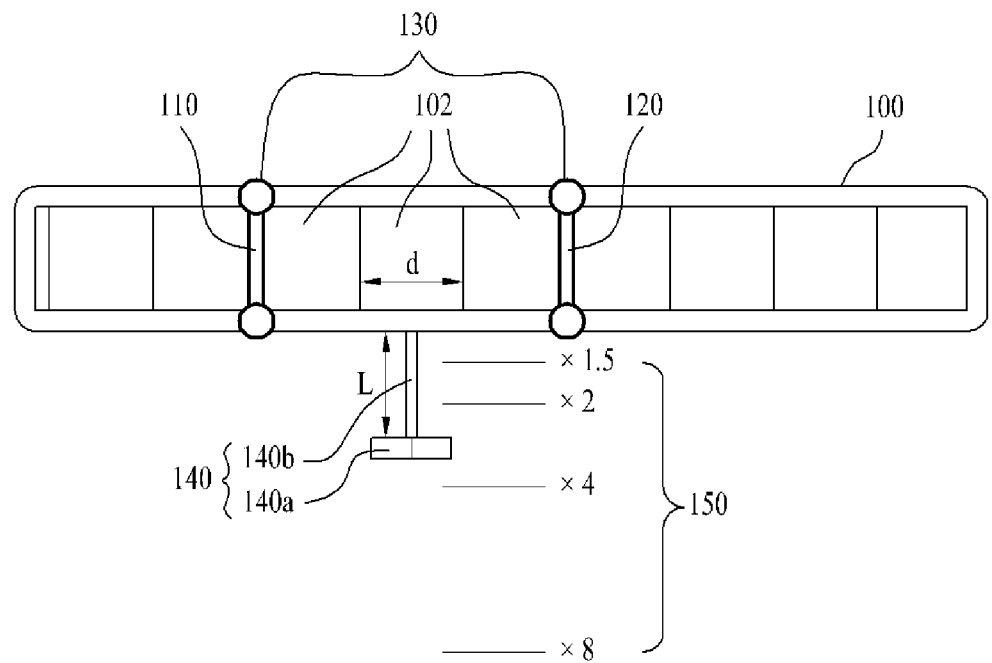
FIGS. 11 to 15 are diagrams illustrating a detailed embodiment of a video editing method of the present invention.
Figure 11B:
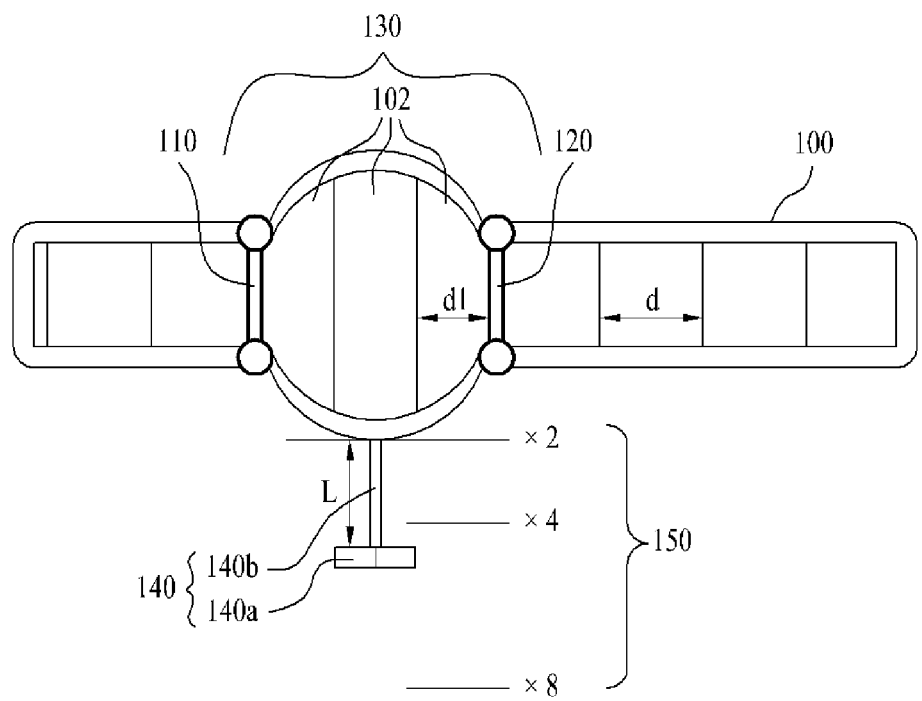
Figure 11C:
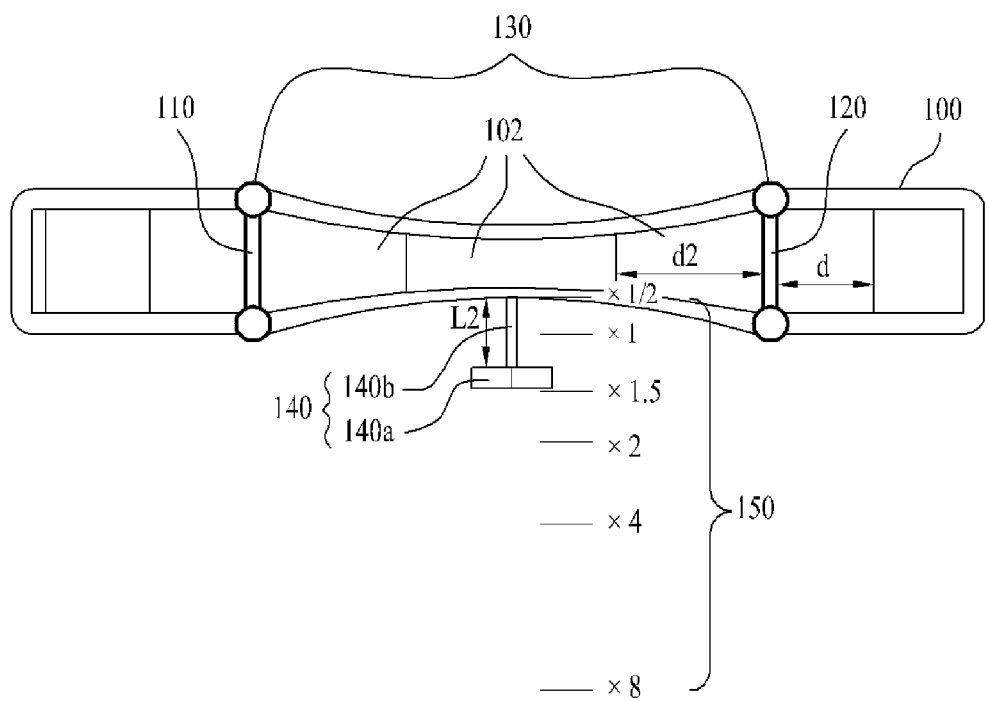

FIGS. 11A to 11C illustrate another embodiment of a video editing method according to the present invention.

First, FIG. 11A illustrates a state in which the editing interval 130 is set on the timeline interface 100. The digital device displays thumbnail images 102 of a video sequence at a preset interval d on the timeline interface 100. The thumbnail images 102 indicate images of frames of the video sequence corresponding to locations of the respective thumbnail images 102 on the timeline interface 100. Meanwhile, the digital device may provide the handle interface 140 described with reference to FIGS. 10A to 10C. The handle interface 140 may include a control part 140a for receiving a third user input and a link part 140b for connecting the control part 140a to the editing interval 130. According to the embodiment of the present invention, the link part 140b may have a preset length L. In addition, according to this embodiment, the digital device may provide a virtual guide interface 150 indicating the playback speed of the video sequence. The virtual guide interface 150 guides the playback speed of the video sequence corresponding to the thickness of the timeline interface 100 of a preset level.

FIG. 11B illustrates an enlarged shape of the thickness of the editing interval 130 according to an embodiment of the present invention. The thickness of the editing interval 130 may be enlarged according to the various above-described embodiments of the present invention. That is, the thickness of the editing interval 130 may be enlarged by a sliding input of at least one interval of the timeline interface 100, a sliding input of at least one of the first indicator 110 and the second indicator 120, or a location shifting input of the handle interface.

According to the embodiment of the present invention, when the thickness of the editing interval 130 is enlarged, the digital device may adjust the thickness of the editing interval 130 such that it has a convex shape. Namely, the digital device may adjust the thickness of the editing interval 130 such that the editing interval 130 becomes gradually thicker towards a central part from both ends at which the first indicator 110 and the second indicator 120 are located. According to this embodiment, the thickness of the editing interval 130 may be adjusted to have a convex shape when the thickness of the editing interval 130 exceeds a preset thickness (e.g. the basic thickness of the timeline interface 100). Hence, if the playback speed of the partial sequence is higher than the basic playback speed of the video sequence, the digital device may provide a visual effect of expanding the editing interval 130. In this case, the thickness of the central part of the editing interval 130 indicates the playback speed of the partial sequence corresponding to the editing interval 130. In FIG. 11B, since the central part of the editing interval 130 is located at an indication of double speed (×2) on the virtual guide interface 150, it may be appreciated that the playback speed of the partial sequence corresponding to the editing interval 130 is double speed. In this case, the thickness of the central part of the editing interval 130 may be twice the basic thickness of the timeline interface 100.

Meanwhile, when the thickness of the editing interval 130 is enlarged, a preset interval of the thumbnail image 102 displayed in the editing interval 130 may be reduced to d1 (d1<d). The interval d1 of the thumbnail image 102 may be adjusted based on the playback speed of the partial sequence corresponding to the editing interval 130. For example, if the playback speed of the partial sequence corresponding to the editing interval 130 in FIG. 11B is double speed, the digital device may change the interval d1 to ½ times the basic interval d of the thumbnail image 102 on the timeline interface 100. Then, a user can be intuitively aware of the playback speed of the partial sequence corresponding to the editing interval 130 through the interval of the thumbnail image in the editing interval 130.

Next, FIG. 11C illustrates a reduced shape of the thickness of the editing interval 130 according to an embodiment of the present invention. The thickness of the editing interval 130 may be reduced according to the various above-described embodiments of the present invention. That is, the thickness of the editing interval 130 may be shortened by a sliding input of at least one interval of the timeline interface 100, a sliding input of at least one of the first indicator 110 and the second indicator 120, or a location shifting input of the handle interface.

According to the embodiment of the present invention, when the thickness of the editing interval 130 is shortened, the digital device may adjust the thickness of the editing interval 130 such that it has a concave shape. Namely, the digital device may adjust the thickness of the editing interval 130 such that the editing interval 130 becomes gradually thinner towards a central part from both ends at which the first indicator 110 and the second indicator 120 are located. According to the present embodiment, the thickness of the editing interval 130 is adjusted to have a concave shape when the thickness of the editing interval 130 becomes thinner than a preset thickness (e.g. the basic thickness of the timeline interface 100). Hence, if the playback speed of the partial sequence is lower than the basic playback speed of the video sequence, the digital device may provide a visual effect of shrinking the editing interval 130. In this case, the thickness of the central part of the editing interval 130 indicates the playback speed of the partial sequence corresponding to the editing interval 130. In FIG. 11C, since the central part of the editing interval 130 is located at an indication of ½ speed (×½) on the virtual guide interface 150, it may be appreciated that the playback speed of the partial sequence corresponding to the editing interval 130 is ½ speed. In this case, the thickness of the central part of the editing interval 130 may be ½ times the basic thickness of the timeline interface 100.

When the thickness of the editing interval 130 is shortened, a preset interval of the thumbnail image 102 displayed in the editing interval 130 may be enlarged to d2 (d2>d). The interval d2 of the thumbnail 102 may be adjusted based on the playback speed of the partial sequence corresponding to the editing interval 130. For example, if the playback speed of the partial sequence corresponding to the editing interval 130 in FIG. 11C is ½ speed, the interval d2 may be adjusted to be twice the basic interval d of the thumbnail image 102 on the timeline interface 100.

According to still another embodiment of the present invention, when the thickness of the editing interval 130 is shortened, the digital device may reduce the length of the link part 140b of the handle interface 140 connected to the editing interval 130 to L2 (L2<L). In this case, the digital device may reduce the length of the link part 140b when the thickness of the editing interval 130 is less than the preset thickness (e.g. the basic thickness of the timeline interface 100). According to this embodiment, if the playback speed of the partial sequence is lower than the basic playback speed of the video sequence, variation in the thickness of the editing interval 130 corresponding to variation in the playback speed is small. Accordingly, when adjusting the thickness of the editing interval 130 using the handle interface 140, a user should minutely manipulate the handle interface 140 in the case of a low playback speed of the partial sequence.

For example, when the playback speed of the video sequence is changed to double speed (×2) from 1 speed (×1), the thickness of the editing interval 130 is increased to 2a from a. Accordingly, a user needs to shift the handle interface 140 by ½a which is half the thickness variation (|2a−a|) of the editing interval 130. On the other hand, if the playback speed of the video sequence is changed to ½ speed from 1 speed, the thickness of the editing interval 130 is reduced to (½)a from a. Then, a user should shift the handle interface 140 by (¼)a which is half the thickness variation (|(½)a−a|) of the editing interval 130. Namely, when the playback speed of the partial sequence is low, since the handle interface 140 should be minutely manipulated, manipulation of the handle interface 140 may be inconvenient.

Therefore, the digital device according to the embodiment of the present invention may reduce the length of the link part 140a to L2 (L2<L) from a basic length L when the thickness of the editing interval 130 is less than a preset thickness. More desirably, the digital device may adjust the length of the link part 140a such that the length of the link part 140a is gradually reduced as the thickness of the editing interval 130 becomes thinner. Then, a user can minutely adjust the playback speed of the partial sequence through the handle interface 140 even when the playback speed of the partial sequence is low.

FIGS. 12A to 13C illustrate another embodiment of a video editing method according to the present invention.

Figure 12A:
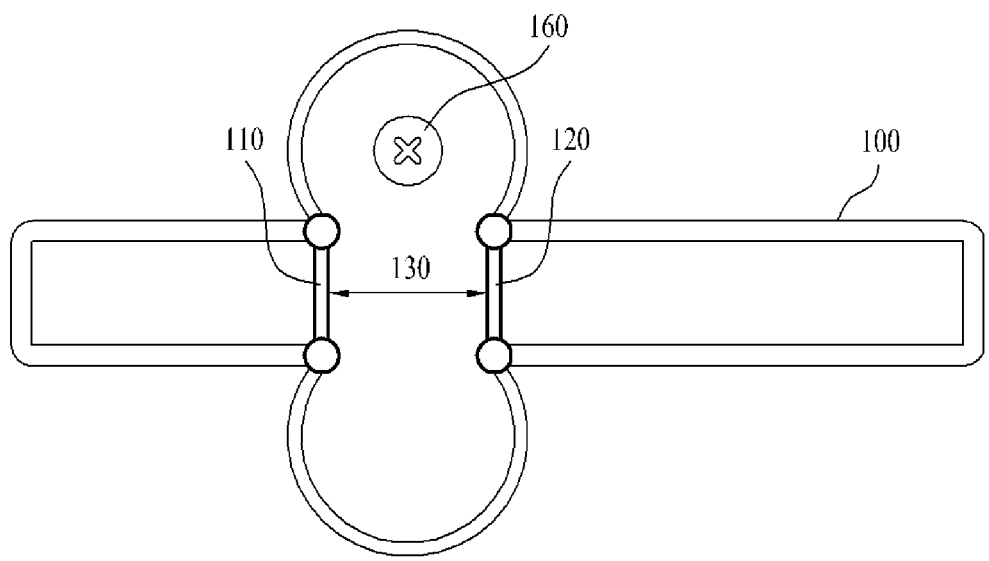

FIG. 12A shows an additionally provided interface when the thickness of the editing interval 130 becomes thicker than the basic thickness of the timeline interface 100. Referring to FIG. 12A, the digital device may provide an interface 160 for deleting the editing interval 130. As shown in FIG. 12A, when the distance between the first indicator 110 and the second indicator 120 becomes shorter, the thickness of the editing interval 130 is expanded. In this case, if the distance between the first indicator 110 and the second indicator 120 is nearer than a preset minimum length of the editing interval 130, the digital device may provide the interface 160 for deleting the editing interval 130. In the present invention, the interface 160 for deleting the editing interval 130 may be provided by assigning user interfaces of various methods or graphical effects on the editing interval 130 and may also be provided on other areas except for the editing interval 130.

Figure 12B:
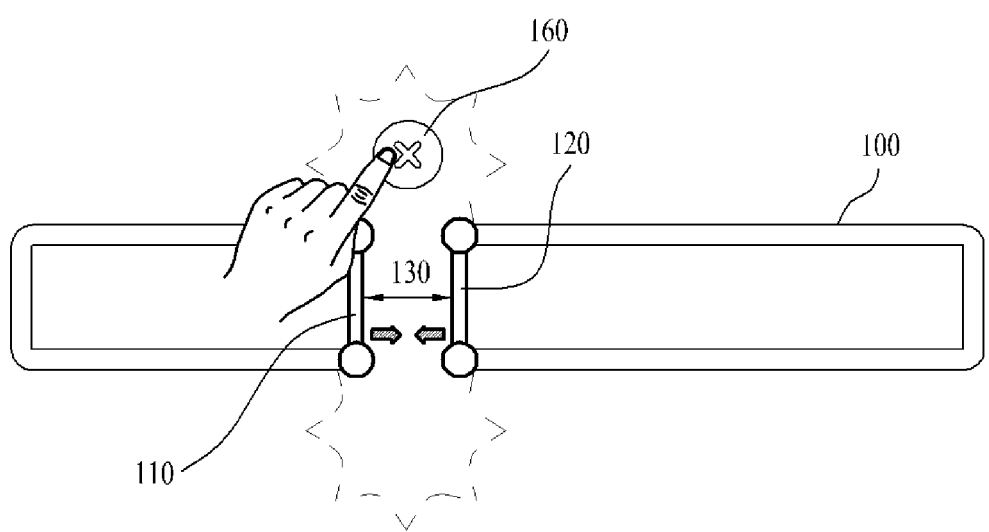

As shown in FIG. 12B, a user may delete the editing interval 130 through an input for the interface 160. The digital device deletes the partial sequence corresponding to the editing interval 130 from the video sequence in response to the user input for deleting the editing interval 130. In addition, the digital device may perform adjustment such that intervals (the first interval and the second interval) adjacent to both sides of the editing interval 130 are adjacent to each other. According to the present embodiment, the digital device may assign a graphical effect in which the editing interval 130 appears to burst in response to the user input for the interface 160.

Figure 13A:
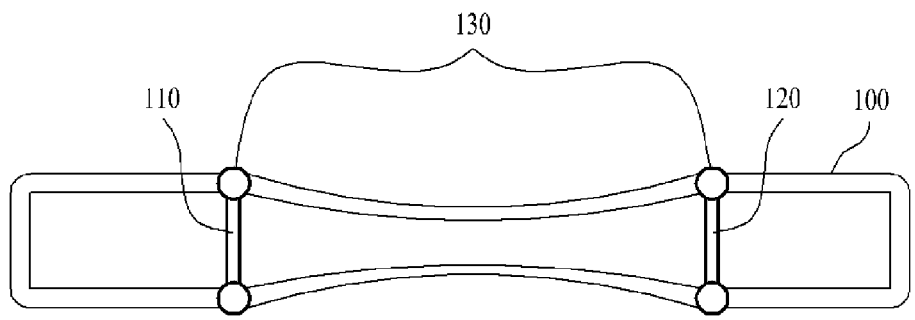
Figure 13B:
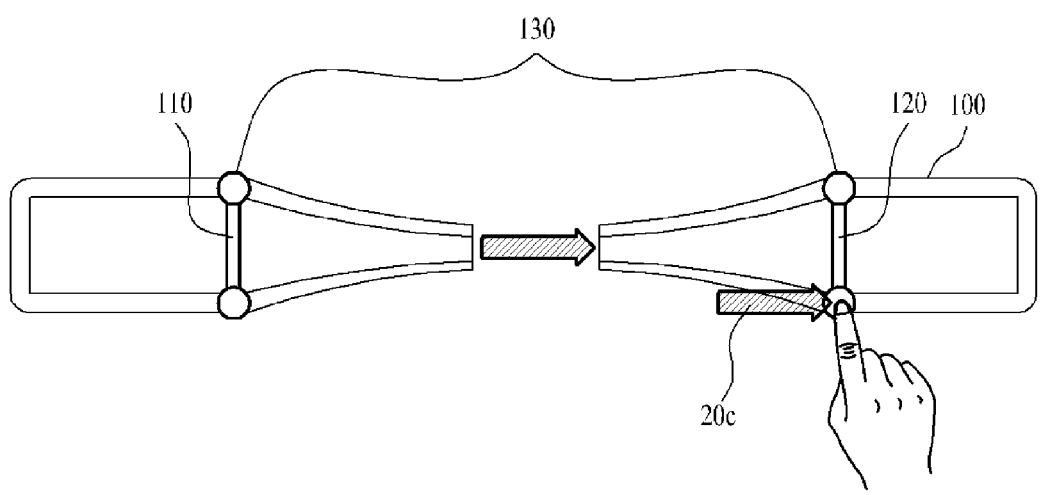
Figure 13C:
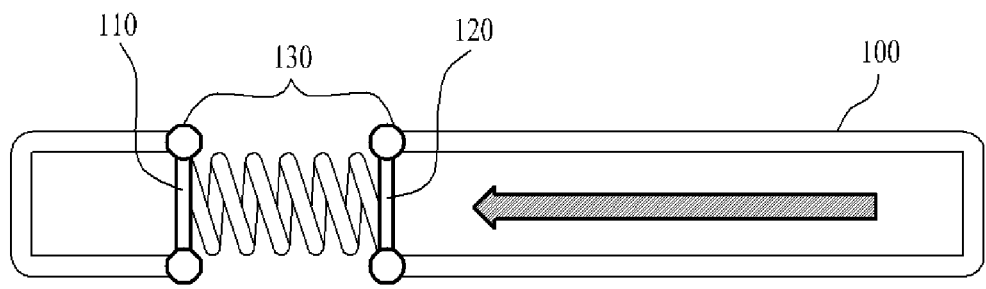

FIGS. 13A to 13C illustrate an additionally provided interface when the thickness of the editing interval 130 is thinner than the basic thickness of the timeline interface 100 according to an embodiment of the present invention. First, according to the embodiment of the present invention, the digital device may adjust the thickness of the editing interval 130 such that it is maintained at a preset minimum thickness or more. The digital device may pre-designate the minimum thickness of the editing interval and the minimum playback speed of the partial sequence based on the minimum thickness of the editing interval. Accordingly, even if the thickness of the editing interval is reduced by a user input, the digital device may adjust the thickness of the editing interval such that it is not less than the preset minimum thickness. For example, the thickness of the editing interval 130 may become narrower and reach the preset minimum thickness as illustrated in FIG. 13A. At this time, the length of the editing interval 130 reaches a preset maximum length. The preset maximum length of the editing interval 130 is determined based on the length of the editing interval 130 during initial setting and the preset minimum thickness of the editing interval 130. In FIG. 13A, the editing interval 130 reaches a threshold state in which the thickness of the editing interval 130 cannot be reduced any longer and the length of the editing interval 130 cannot be enlarged any longer.

As shown in FIG. 13B, if the user input 20c through which the distance between the first indicator 110 and the second indicator 120 is further apart than the preset maximum length of the editing interval 130 is received, the digital device may adjust the editing interval 130 such that at least one area of the editing interval 130 is separated from the editing interval 130. In this case, the digital device may maintain the thickness of the editing interval 130 at the preset minimum thickness. If the user input 20c is ended, the digital device may restore the editing interval 130 to the state of FIG. 13A.

Referring to FIG. 13C, the digital device may provide an interface for compressive display of the editing interval 130. The interface for compressive display of the editing interval 130 is an interface for displaying the editing interval 130 by shortening the length of the editing interval 130. In this embodiment, if the editing interval 130 is displayed in a reduced form, the digital device displays the editing interval 130 by shortening the length of the editing interval 130 while maintaining the playback speed and playback duration of the partial sequence corresponding to the editing interval 130. The digital device may provide interfaces of various methods as the interface for compressive display of the editing interval 130. For example, the digital device may use a user input, such as double touch, double click, etc., with respect to the editing interval as the interface for compressive display and provide an additional interface. The digital device may display the editing interval 130 in the form of a spring as illustrated in FIG. 13C as a compressive display form. In this case, the digital device may adjust the thickness of the spring such that it corresponds to the thickness of the editing interval prior to compressive display. According to an embodiment of the present invention, when the thickness of the editing interval 130 is thinner than the basic thickness of the timeline interface 100, the digital device may provide the interface for compressive display of the editing interval 130. Then, even if a plurality of editing intervals which is adjusted to have a low speed is included on the timeline interface 100, the digital device may provide a whole shape of the timeline interface 100 to a user.

FIG. 14A to FIG. 15C illustrate another embodiment of a video editing method according to the present invention.

Figure 14A:
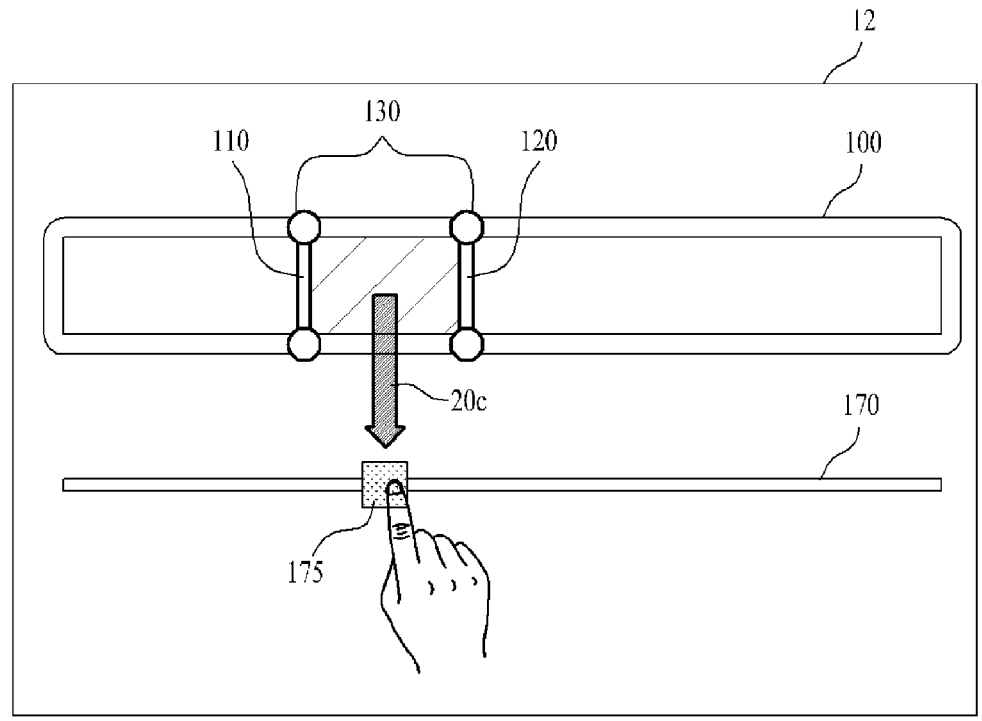
Figure 14B:
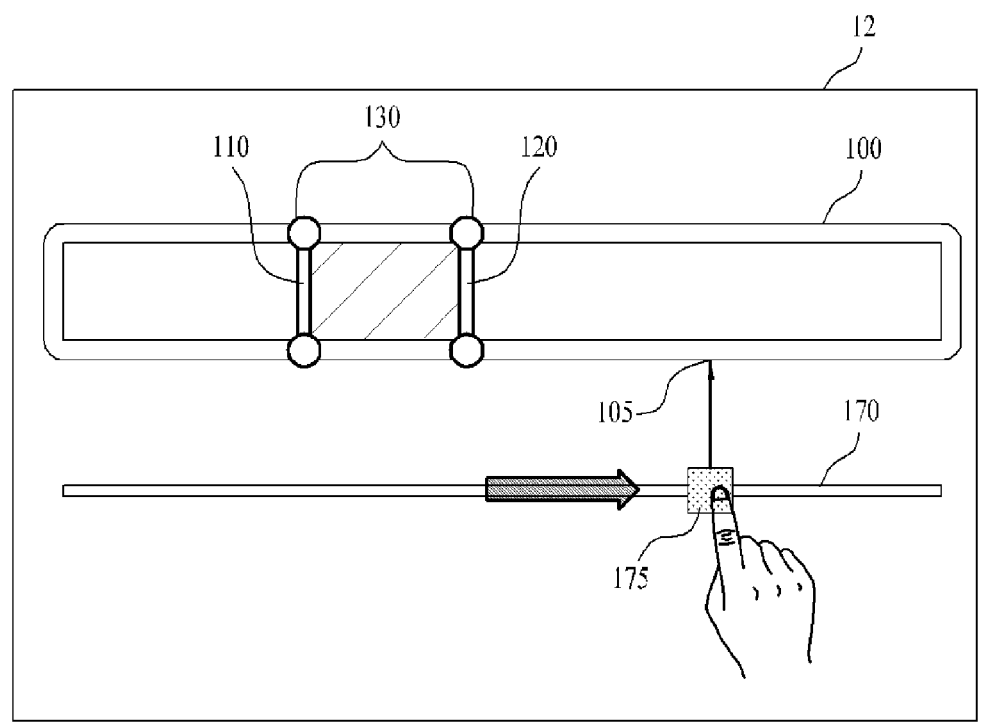
Figure 14C:
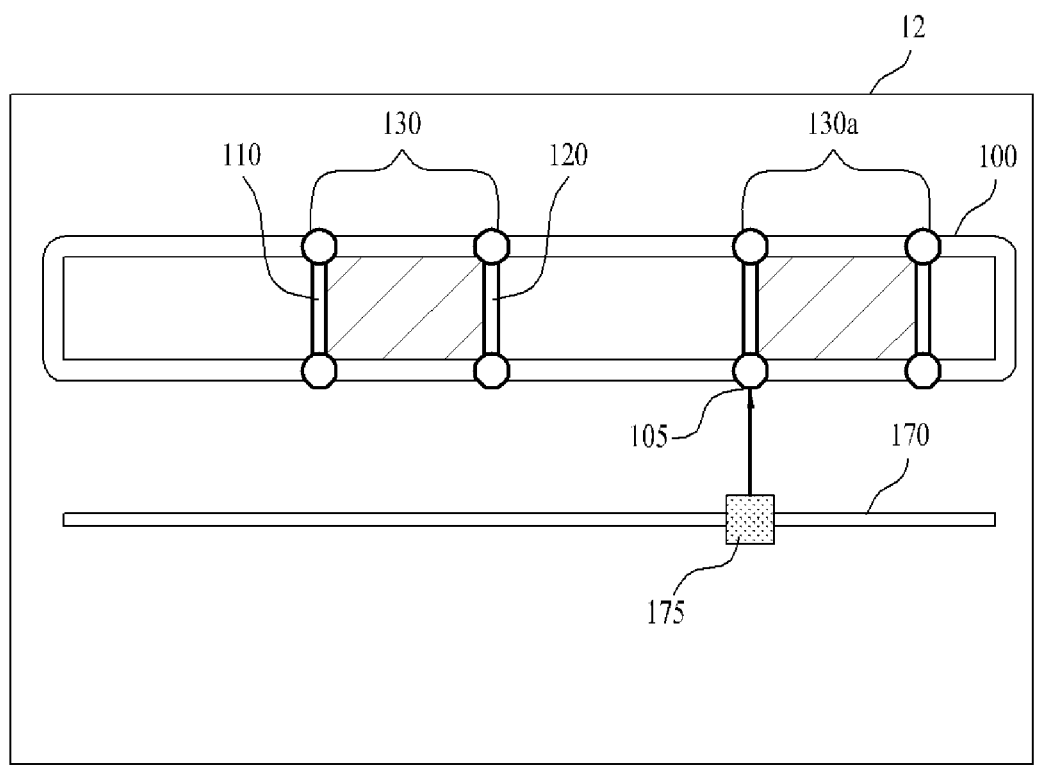

Referring to FIGS. 14A to 14C, the digital device may provide a first track interface 170 for a copy and paste operation of the partial sequence. The first track interface 170 may be activated by the preset third user input 20c. For example, as illustrated in FIG. 14A, the first track interface 170 may be activated in response to the third user input 20c of shifting the editing interval 130 in a preset direction to an area in which the first track interface 170 is activated. In this embodiment, the preset direction may be a specific direction in which the editing interval 130 is separated from the timeline interface 100. More specifically, the third user input 20c may include an input of separating the editing interval 130 from the timeline interface 100 to move on the first track interface 170.

Meanwhile, if the first track interface 170 is activated, the digital device may provide a paste indicator 175 which is movable on the first track interface 170. The paste indicator 175 is an interface corresponding to a copied sequence of the partial sequence corresponding to the editing interval 130. A user may insert the copied sequence into the video sequence by shifting the paste indicator 175 on the first track interface 170.

Referring to FIG. 14B, a user may shift the paste indicator 175 on the first track interface 170. In this case, the digital device may provide an indicator indicating a third location 105 on the timeline interface 100 corresponding to the location of the paste indicator 175. According to the present embodiment, the third user input 20c may include an input of shifting the paste indicator 175 on the first track interface 170. According to another embodiment of the present invention, the third user input 20c may include an input of separating the editing interval 130 from the timeline interface 100 to move on the first track interface 170. In this case, the digital device may specify the third location 105 on the timeline interface 100 based on the third user input 20c without providing the additional paste indicator 175.

Meanwhile, as illustrated in FIG. 14C, if the movement of the paste indicator 175 is completed, the digital device may paste a copied editing interval 130a to the third location 105 of the timeline interface 100. The third location 105 is a specific location on the timeline interface 100, corresponding to a movement completion location of the paste indicator 175 on the first track interface 170. The digital device inserts the copied sequence of the partial sequence into an area on the video sequence corresponding to the third location 105 of the timeline interface 100. Thus, the digital device may copy and paste the partial sequence corresponding to the editing interval 130.

Figure 15A:
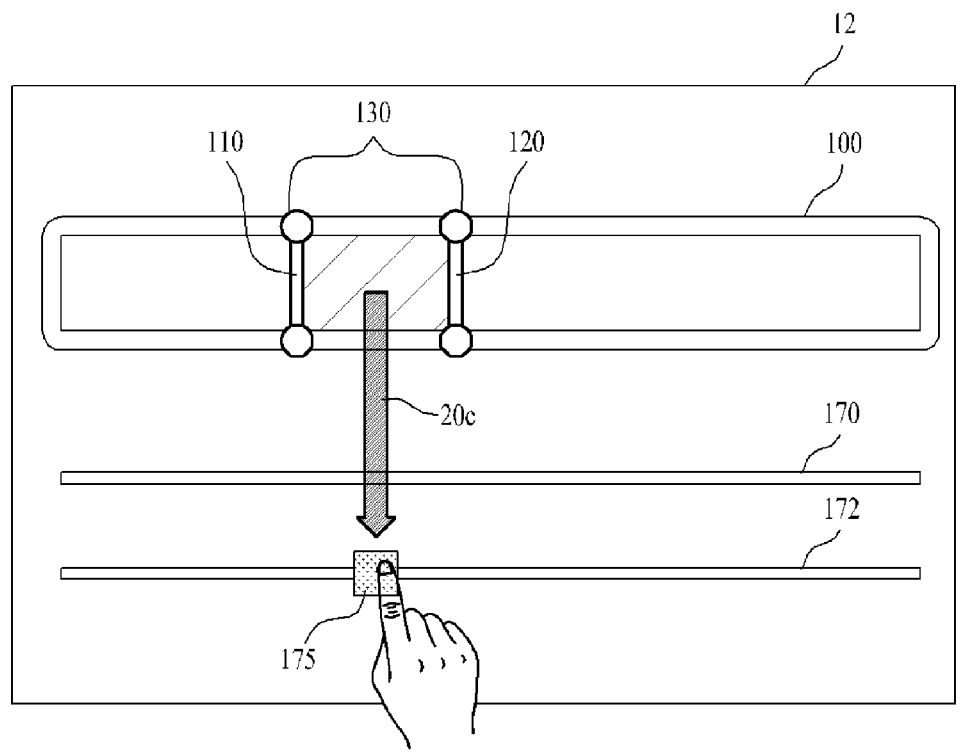
Figure 15B:
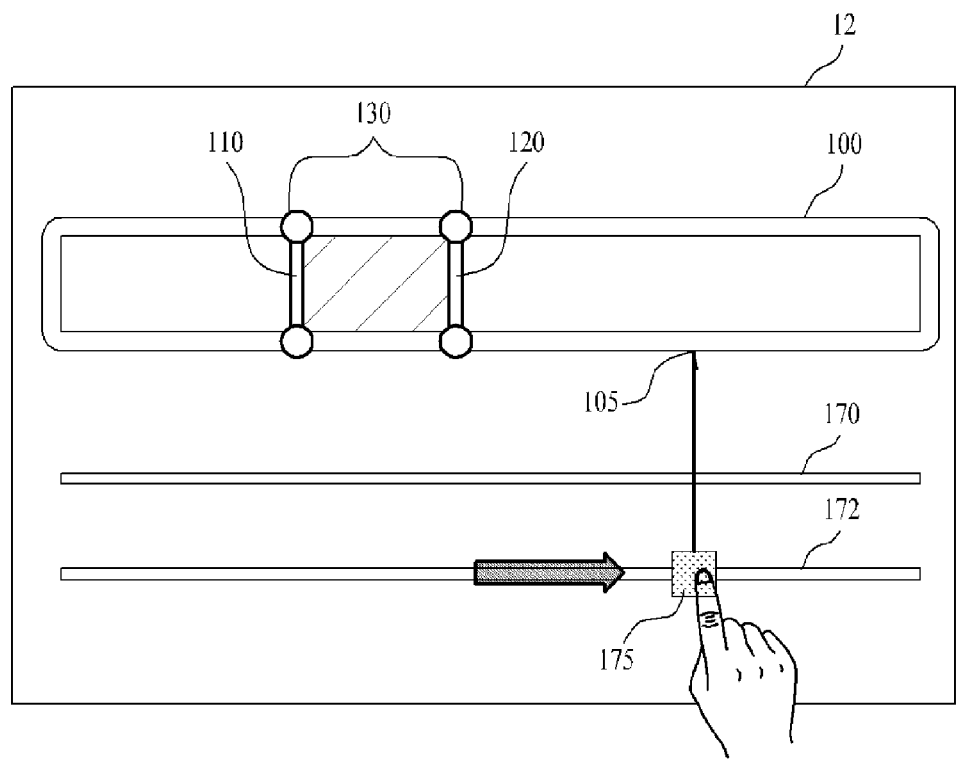
Figure 15C:
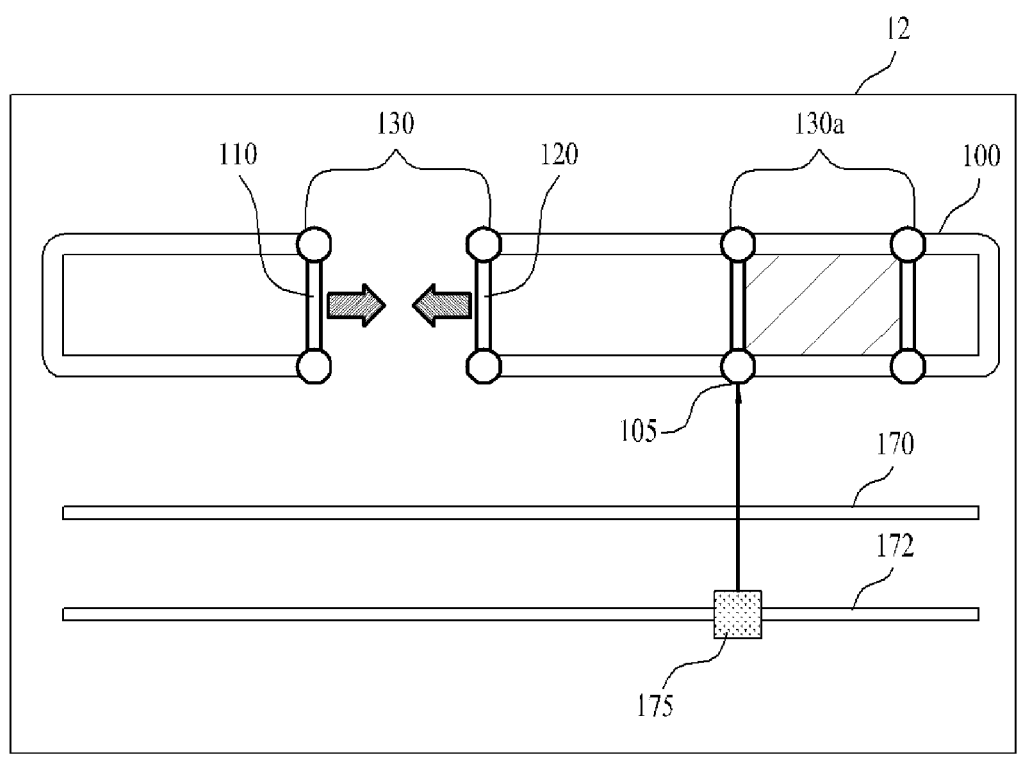

Next, referring to FIGS. 15A to 15C, the digital device may further provide a second track interface 172 for a cut and paste operation of the partial sequence. The second track interface 172 may be activated by the preset third user input 20c. For example, as shown in FIG. 15A, the second track interface 172 may be activated in response to the third user input 20c of shifting the editing interval 130 in a preset direction to an area in which the second track interface 172 is activated. In an embodiment of the present invention, the area in which the second track interface 172 is activated may be an area in a different direction from the area in which the first track interface 170 is activated based on the timeline interface 100 or may be an area spaced farther from the first track interface 170. In the present invention, the third user input 20c may include an input of separating the editing interval 130 from the timeline interface 100 to move on the second track interface 172. A detailed description of the embodiment of FIGS. 15A to 15C which is the same as or corresponding to the embodiment of FIGS. 14A to 14C will be omitted.

Referring to FIG. 15B, a user may shift the paste indicator 175 on the second track interface 174. As illustrated in FIG. 15C, if movement of the paste indicator 175 is completed, the digital device may paste the copied editing interval 130a to the third location 105 of the timeline interface 100. Meanwhile, the digital device deletes the editing interval 130 on the timeline interface 100. In this case, the digital device may perform adjustment such that intervals (the first interval and the second interval) adjacent to both sides of the editing interval 130 are adjacent to each other. In addition, the digital device inserts the copied sequence of the partial sequence to an area on the video sequence corresponding to the third location 105 of the timeline interface 100. Meanwhile, the digital device deletes the partial sequence corresponding to the editing interval 130 from the video sequence. Through the above processes, the digital device may perform a cut and paste operation of the partial sequence corresponding to the editing interval 130.

In the embodiment of the present invention, the digital device may interchange the areas in which the first track interface 170 and the second track interface 172 shown in FIGS. 14A to 15C are activated. If the first track interface 170 or the second track interface 172 is activated, the digital device may display the corresponding track interface on the display unit thereof. However, according to another embodiment of the present invention, the digital device may form a virtual track without displaying the activated track interface.

Figure 16:
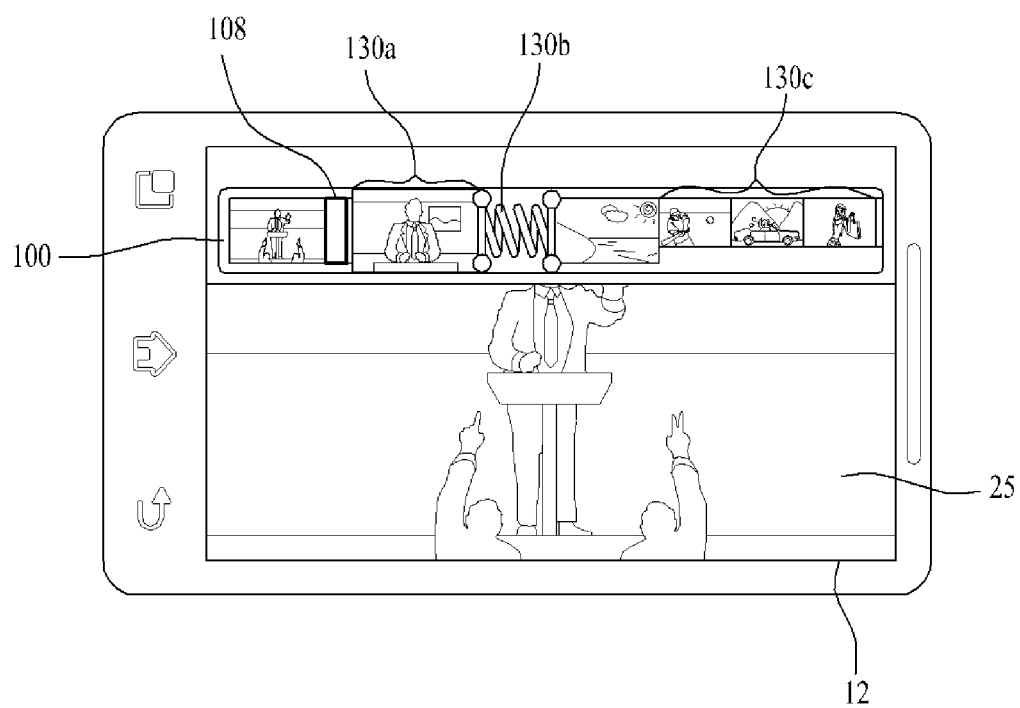
FIG. 16 is a diagram illustrating a timeline interface edited through a video editing UI according to an embodiment of the present invention.

FIG. 16 illustrates a timeline interface 100 edited through a video editing UI according to an embodiment of the present invention. The timeline interface 100 corresponds to a video sequence edited through the video editing UI of the present invention. As shown, the timeline interface 100 includes at least one of editing areas 130a, 130b, and 130c corresponding to partial sequences in which the playback attributes of a video sequence are edited. The editing areas may include the editing area 130*a* corresponding to a partial sequence in which a playback speed is adjusted to be increased, the editing area 130*b* displayed in a compressed form, and the editing area 130*c* corresponding to a partial sequence in which a playback speed is adjusted to be decreased. The thickness of the editing area 130*a* may be thicker than the basic thickness of the timeline interface 100. The thickness of the editing area 130*c* may be thinner than the basic thickness of the timeline interface 100.

On the other hand, if the video sequence is played back on the video editing UI, a progress indicator 108 indicating video sequence progress may be provided on the timeline interface 100. The progress indicator 108 may move at a constant speed on the timeline interface 100. Accordingly, when the progress indicator 108 moves along the editing area 130*a*, the playback speed of the partial sequence corresponding to the editing area 130*a* becomes faster than a playback speed prior to editing. When the progress indicator 108 moves along the editing area 130*c*, the playback speed of the partial sequence corresponding to the editing area 130*c* becomes slower than the playback speed prior to editing. Meanwhile, when the progress indicator 108 moves along the editing area 130*b*, the progress indicator 108 may move along a path of the editing area 130*b* displayed in a compressed form. For example, if the editing area 130*b* is displayed in the form of a spring, the progress indicator 108 may move along a path of the spring form of the editing area 130*b*.

Figure 17:
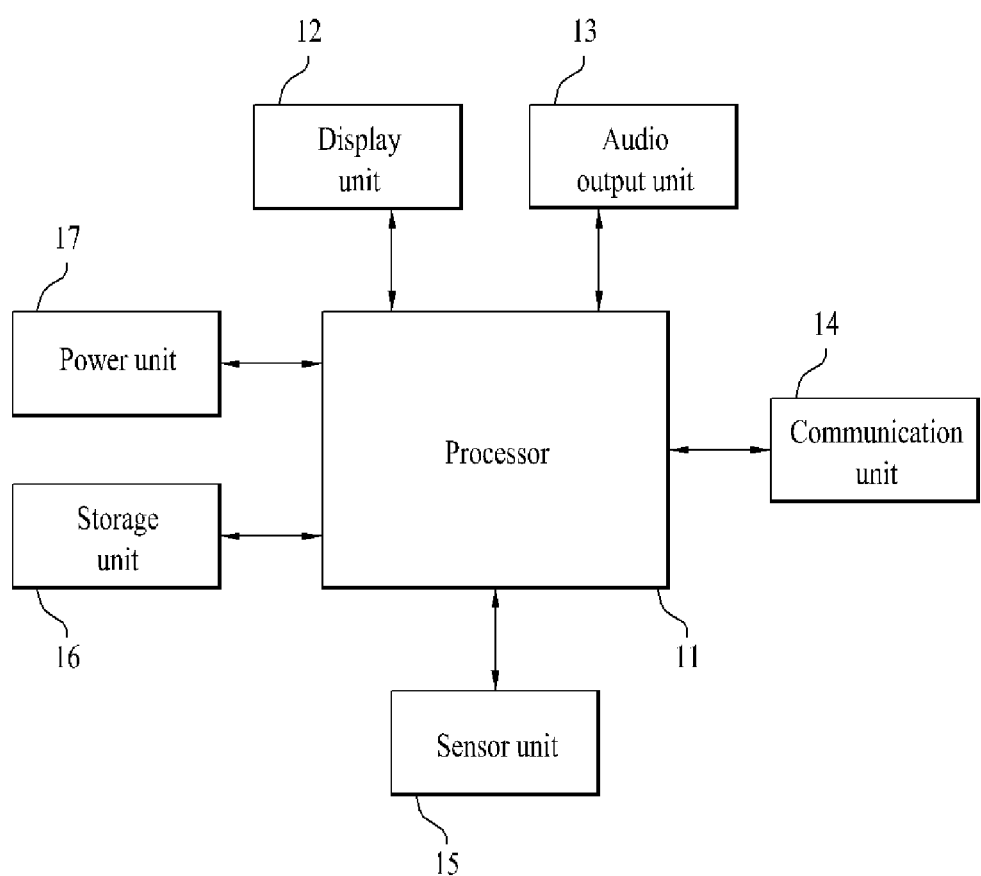
FIG. 17 is a block diagram illustrating a digital device according to an embodiment of the present invention.

FIG. 17 is a block diagram illustrating the digital device 10 according to an embodiment of the present invention.

Referring to FIG. 17, the digital device 10 of the present invention may include a processor 11, a display unit 12, an audio output unit 13, a communication unit 14, a sensor unit 15, a storage unit 16, and a power unit 17.

First, the display unit 12 outputs images on a display screen. The display unit 12 may output images based on content implemented in the processor 11 or a control command of the processor 11. In the embodiment of the present invention, the display unit 12 may display a motion picture editing UI, a timeline interface, etc. executed by the digital device 10 and display images of specific frames of a video sequence specified by the motion picture editing UI.

Next, the audio output unit 13 includes an audio output means such as a speaker, an earphone, etc. The audio output unit 13 may output voice signals based on content implemented in the processor 11 or a control command of the processor 11. According to the embodiment of the present invention, the audio output unit 13 may output voice signals of a video sequence implemented by the video editing UI. In the present invention, the audio output unit 13 is optionally included in the digital device 10.

Next, the communication unit 14 may transmit/receive data by communicating with external devices using various protocols. The communication unit 14 may transmit/receive digital data such as content by accessing a network wirelessly or by wire. In the present invention, the digital device 10 may use the communication unit 14 to receive the video sequence from an external device or a server and to transmit the video sequence edited through the video editing UI of the present invention to the external device or the server. In the present invention, the communication unit 14 is optionally included in the digital device 10.

The sensor unit 15 may recognize a user input of the present invention using at least one sensor installed in the digital device 10 and transmit the user input to the processor 11. The sensor unit 15 may include a plurality of sensing means. As an embodiment, the plurality of sensing means may include a gravity sensor, a geomagnetic sensor, a motion sensor, a gyro sensor, an acceleration sensor, an infrared sensor, an inclination sensor, a brightness sensor, an altitude sensor, an odor sensor, a temperature sensor, a depth sensor, a pressure sensor, a bending sensor, an audio sensor, a video sensor, a Global Positioning System (GPS) sensor, a touch sensor, etc. The sensor unit 15 refers to a variety of sensing means. The sensor unit 15 may sense various user inputs and user environments and transmit a sensing result so that the processor 11 can perform operation according to the sensing result. The above-described sensors may be included in the digital device 10 as separate elements or may be included in the digital device 10 as at least one integrated element.

The storage unit 16 of the present invention may store various digital data such as video, audio, photos, and applications. The storage unit 16 indicates various digital data storage spaces such as a flash memory, a Random Access Memory (RAM), a Solid State Drive (SSD), etc. In the embodiment of the present invention, the storage unit 16 may store video sequences and store video sequences edited through the video editing UI of the present invention.

The power unit 17 is a power source connected to a battery in the digital device 10 or to an external power source and may supply power to the digital device 10.

The processor 11 of the present invention may execute content received through data communication or content stored in the storage unit 16. The processor 11 may implement various applications and process data inside the digital device 10. The processor 11 may execute the video editing UI according to the embodiment of the present invention and edit the video sequence according to the control command of the video editing UI. In addition, the processor 11 may control the above-described units of the digital device 10 and control transmission and reception of data between the units.

The digital device 10 of FIG. 17 is shown as a block diagram according to the embodiment of the present invention and separate blocks are illustrated by logically distinguishing between elements of the digital device. Accordingly, the above-described elements of the digital device may be integrated into one chip or multiple chips according to device design.

FIG. 18 is a flowchart illustrating a video editing method according to an embodiment of the present invention. Each step of FIG. 18, which will be described hereinbelow, is performed by the video editing UI of the present invention and may be controlled by the processor 11 of the digital device 10 shown in FIG. 17.

First, the digital device provides a timeline interface corresponding to a video sequence (step S1810). As illustrated in FIG. 1, at least one thumbnail image of the video sequence may be displayed at a preset interval on the timeline interface.

Next, the digital device receives a first user input for specifying a first location on the timeline interface and a second user input for specifying a second location on the timeline interface (step S1820). As described with reference to FIGS. 2A and 2B, the first location corresponds to the first frame of the video sequence and the second location corresponds to the second frame of the video sequence.

The digital device sets an editing interval between the first location and the second location of the timeline interface (step S1830). In this case, the digital device may provide a first indicator corresponding to the first frame and a second indicator corresponding to the second frame at both ends of the editing interval. At least one of the first indicator and the second indicator is movable on the timeline interface. As described with reference to FIG. 2B, the editing interval corresponds to the partial sequence between the first frame and second frame of the video sequence. According to the embodiment of the present invention, the digital device may set intervals adjacent to both sides of the editing interval on the timeline interface as a first interval and a second interval.

The digital device receives a third user input with respect to the editing interval (step S1840). The third user input includes an input of sliding at least one object of the timeline interface on the timeline interface. The object may be at least one of the editing interval, the first interval, and the second interval on the timeline interface as described with reference to FIGS. 3A to 6. The object may also be at least one of the first indicator and the second indicator as described with reference to FIGS. 7A to 9D. The third user input may be an input of sliding the handle interface connected to the editing interval as described with reference to FIGS. 10A to 10C.

The digital device adjusts at least one of the thickness and length of the editing interval in response to the third user input (step S1850). The thickness of the editing interval is proportional to the playback speed of the partial sequence and the length of the editing interval is proportional to the playback duration of the partial sequence. As described with reference to FIGS. 3A to 15C, the digital device may adjust the thickness and length of the editing interval according to the various embodiments of the present invention. Meanwhile, according to the embodiment of the present invention, if the thickness of the editing interval is reduced to a preset thickness or less, the digital device may adjust the thickness of the editing interval such that it has a concave shape, and if the thickness of the editing interval is enlarged to the preset thickness or more, the digital device may adjust the thickness of the editing interval such that it has a convex shape. In addition, as described with reference to FIGS. 11A to 11C, the digital device may adjust the interval of a thumbnail image displayed on the timeline interface such that it corresponds to the thickness of the editing interval. That is, the digital device may reduce the displayed interval of the thumbnail image when enlarging the thickness of the editing interval and may enlarge the displayed interval of the thumbnail image when reducing the thickness of the editing interval.

The digital device edits the playback attributes of the partial sequence based on the adjusted thickness and length of the editing interval (step S1860). The playback attributes of the partial sequence include the playback speed of the partial sequence. According to the embodiment of the present invention, the playback attributes of the partial sequence may include playback/non-playback of the partial sequence. That is, the digital device may delete the partial sequence as shown in the embodiment of FIGS. 12A and 12B and the deleted partial sequence may be deleted from a playback sequence of the video sequence. According to another embodiment of the present invention, the playback attributes of the partial sequence may include reverse playback/non-reverse playback of the partial. That is, the digital device may generate the reverse playback sequence of the partial sequence as shown in the embodiment of FIGS. 6 and 7D. The reverse playback sequence is a reverse sequence in which frames of the partial sequence are reversed. If the playback speed of the partial sequence is adjusted according to the embodiment of the present invention, the playback duration of the corresponding partial sequence may also be adjusted. According to the embodiment of FIGS. 3A to 6, the playback speed of the partial sequence may be adjusted while keeping the playback duration of the partial sequence constant. In this case, the number of frames included in the partial sequence may be adjusted.

Editing information of the video sequence edited through the video editing UI according to the embodiment of the present invention may be stored in various ways. For example, the digital device may encode the video sequence based on the playback attributes of the edited partial sequence. That is, the digital device may generate a new video sequence in which the playback speed of the partial sequence and other playback attributes are adjusted. According to another embodiment of the present invention, the digital device may generate additional information corresponding to the playback attributes of the edited partial sequence. The additional information is information about adjustment of the playback speed of the partial sequence and other playback attributes and may be included as header information of the video sequence. In this case, the digital device or external device may generate a video sequence in which the playback speed of the partial sequence and other playback attributes are reflected based on the additional information.

According to the present invention, the playback attributes of a video sequence can be edited through an intuitive and simple user input.

According to an embodiment of the present invention, a user can adjust the number of frames of a partial sequence to be played back during a preset playback duration and thus can adjust the playback speed of the corresponding partial sequence.

According to another embodiment of the present invention, a user can conveniently adjust the playback duration and playback speed of a partial sequence corresponding to a preset frame interval.

The present invention provides a handle interface for adjusting the playback duration and playback speed of a partial sequence and thus a user can conveniently adjust the playback attributes of the partial sequence.

According to the embodiment of the present invention, the thickness and length of an editing interval of a timeline interface corresponding to a partial sequence vary with variation in the playback attributes of the partial sequence. In addition, a digital device provides various user interfaces which can recognize variation in the playback attributes of the partial sequence. Accordingly, a user can intuitively recognize variation in the thickness and length of an editing interval, and the adjusted playback attributes of the corresponding partial sequence through the various user interfaces.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video editing method comprising:
   displaying a timeline interface corresponding to a video sequence, wherein the timeline interface displays a plurality of thumbnail images of the video sequence at a preset interval on the timeline interface;
   specifying a first location on the timeline interface by receiving a first touch input, and a second location on the timeline interface by receiving a second touch input, wherein the first location corresponds to a first frame of the video sequence and the second location corresponds to a second frame of the video sequence;
   setting an editing interval between the first location and the second location of the timeline interface, wherein the setting includes displacing a first indicator corresponding to the first frame and a second indicator corresponding to the second frame at both ends of the editing interval, at least one of the first indicator and the second indicator is movable on the timeline interface, the editing interval corresponds to a partial sequence of the video sequence, and the partial sequence is a sequence between the first frame and the second frame of the video sequence;

receiving a third touch input with respect to the editing interval, wherein the third touch input includes a touch input of sliding at least one of the first indicator and the second indicator along the timeline interface;

adjusting a thickness and length of the editing interval in response to the third touch input, wherein the thickness of the editing interval is proportional to a playback speed of the partial sequence, and the length of the editing interval is proportional to a playback duration of the partial sequence, wherein the playback speed of the partial sequence increases when the thickness of the editing interval is enlarged, and the playback speed of the partial sequence decreases when the thickness of the editing interval is reduced, and wherein the playback speed of the partial sequence increases when the length of the editing interval is shortened, and the playback speed of the partial sequence decreases when the length of the editing interval is enlarged; and changing playback attributes of the partial sequence according to the adjusted thickness and length of the editing interval, wherein the playback attributes of the partial sequence include the playback speed of the partial sequence.

2. The video editing method according to claim 1, wherein the timeline interface includes the editing interval, a first interval, and a second interval, wherein the first interval is adjacent to the first indicator and contiguous to the editing interval, and the second interval is adjacent to the second indicator and contiguous to the editing interval, and wherein the third touch input includes a touch input of sliding at least one of the first interval and the second interval.

3. The video editing method according to claim 2, further comprising:

resetting the partial sequence in response to the third touch input, wherein the resetting includes resetting the first frame corresponding to the first indicator in response to the third touch input of sliding the first interval and resetting the second frame corresponding to the second indicator in response to the third touch input of sliding the second interval.

4. The video editing method according to claim 3, wherein the adjusting includes enlarging or reducing the thickness of the editing interval while keeping the length of the editing interval constant in correspondence to resetting of the partial sequence, wherein the thickness of the editing interval is enlarged in response to the third touch input of sliding at least one of the first interval and the second interval in the direction of the editing interval, and wherein the thickness of the editing interval is reduced in response to the third touch input of sliding at least one of the first interval and the second interval in the opposite direction of the editing interval.

5. The video editing method according to claim 2, wherein the third touch input is a touch input for rotating the editing interval, wherein the adjusting includes reversing the editing interval such that the second indicator is adjusted to be adjacent to the first interval and the first indicator is adjusted to be adjacent to the second interval, and wherein the changing includes reversely arranging a playback order of frames of the partial sequence from the second frame to the first frame.

6. The video editing method according to claim 1, wherein the adjusting includes enlarging or reducing the length of the editing interval in response to the third touch input of sliding at least one of the first indicator and the second indicator, and reducing or enlarging the thickness of the editing interval in inverse proportion to the enlargement or reduction of the length of the editing interval.

7. The video editing method according to claim 6, wherein the adjusting includes adjusting the thickness of the editing interval so as to be concave when the thickness of the editing interval is reduced to a preset thickness or less, and adjusting the thickness of the editing interval so as to be convex when the thickness of the editing interval is enlarged to the preset thickness or more, and wherein the thickness of a central part of the editing interval is proportional to the playback speed of the partial sequence.

8. The video editing method according to claim 6, wherein, if the locations of the first indicator and the second indicator are interchanged by the third touch input of sliding at least one of the first indicator and the second indicator, the adjusting includes adjusting the second indicator so as to be adjacent to the first interval and adjusting the first indicator so as to be adjacent to the second interval, and wherein the changing includes reversely arranging a playback order of frames of the partial sequence from the second frame to the first frame.

9. The video editing method according to claim 6, wherein each of the first indicator and the second indicator includes an adjustment part, wherein the third touch input includes a touch input of shifting the location of at least one of the adjustment part of the first indicator and the adjustment part of the second indicator along the timeline interface, wherein the method further comprises resetting the partial sequence in response to the third touch input of shifting the location of the at least one of the adjustment parts, wherein the resetting includes resetting the first frame corresponding to the first indicator based on the location shifting of the adjustment part of the first indicator, and resetting the second frame corresponding to the second indicator based on the location shifting of the adjustment part of the second indicator, and wherein the adjusting includes adjusting the length of the editing interval while keeping the thickness of the editing interval constant in response to the third touch input of shifting the location of the at least one of the adjustment parts.

10. The video editing method according to claim 6, wherein each of the first indicator and the second indicator includes a body part and an adjustment part, wherein the third touch input includes a touch input of shifting the location of the adjustment part of a corresponding indicator along the timeline interface while holding the body part of at least one of the first indicator and the second indicator, wherein the changing includes inserting a freeze frame of the first frame into a first frame area of the partial sequence in correspondence to the location shifting of the adjustment part of the first indicator, and inserting a freeze frame of the second frame into a second frame area of the partial sequence in correspondence to the location shifting of the adjustment part of the second indicator, and wherein a playback duration of the freeze frame of the first frame is determined based on a displacement of the adjustment part of the first indicator and a playback duration of the freeze frame of the second frame is determined based on a displacement of the adjustment part of the second indicator.

11. The video editing method according to claim 6, wherein, if a distance between the first indicator and the second indicator is adjusted to be further apart than a preset maximum length of the editing interval by the third touch input of sliding at least one of the first indicator and the second indicator, the adjusting includes adjusting at least one area of the editing interval so as to be separated while maintaining the thickness of the editing interval at a preset minimum thickness.

12. The video editing method according to claim 6, wherein, if a distance between the first indicator and the second indictor is adjusted to be less than a preset minimum length of the editing interval by the third touch input of sliding at least one of the first indicator and the second indicator, the method further comprises displaying an interface for deleting the editing interval, and wherein the changing includes deleting the partial sequence from the video sequence in response to a user input of deleting the editing interval.

13. The video editing method according to claim 1, wherein the setting includes displaying a handle interface for adjusting the thickness of the editing interval, wherein the third touch input is a touch input of sliding the handle interface in a thickness direction of the editing interval, wherein the adjusting includes enlarging or reducing the thickness of the editing interval in response to the third touch input of sliding the handle interface, and reducing or enlarging the length of the editing interval in inverse proportion to the enlargement or reduction of the editing interval, wherein, if the thickness of the editing interval is reduced to a preset thickness or less, the thickness of the editing interval is adjusted so as to be concave, and if the thickness of the editing interval is extended to the preset thickness or more, the thickness of the editing interval is adjusted so as to be convex, and wherein the thickness of a central part of the editing interval is proportional to the playback speed of the partial sequence.

14. The video editing method according to claim 13, wherein the handle interface includes a control part for receiving the third touch input of sliding the handle interface and a link part for connecting the control part to the editing interval, and if the thickness of the editing interval is reduced to the preset thickness or less by sliding of the control part, a length of the connection direction of the link part is reduced.

15. The video editing method according to claim 1, wherein at least one of the thumbnail images indicates an image of a frame of the video sequence corresponding to a location of the timeline interface, and the preset interval is adjusted in correspondence to a playback speed of the video sequence.

16. The video editing method according to claim 1, further comprising displaying a virtual guide interface for guiding a playback speed of the video sequence corresponding to a thickness of the timeline interface of a preset level.

17. The video editing method according to claim 1, wherein the setting includes displaying an interface for deleting at least one of the first indicator and the second indicator, and wherein the setting of the editing interval is released in response to a user input for deleting at least one of the first indicator and the second indicator.

18. The video editing method according to claim 1, further comprising:

displaying a first track interface for a copy and paste operation of the partial sequence in correspondence to the timeline interface; and displaying a paste indicator which is movable on the first track interface and corresponds to a copied sequence of the partial sequence, wherein the third touch input is a touch input for shifting the paste indicator on the first track interface, wherein the adjusting includes pasting a copied editing interval to a third location of the timeline interface corresponding to a shifting completion location of the paste indicator, and wherein the changing includes inserting the copied sequence into an area on the video sequence corresponding to the third location.

19. The video editing method according to claim 18, further comprising:

displaying a second track interface for a cut and paste operation of the partial sequence in correspondence to the timeline interface, wherein the paste indicator is movable on at least one of the first track interface and the second track interface, and the third touch input is a touch input of shifting the paste indicator on at least one of the first track interface and the second track interface, and if the shifting of the paste indicator is completed on the second track interface, the adjusting includes deleting the editing interval on the timeline interface and the changing includes deleting the partial sequence from the video sequence.

20. The video editing method according to claim 1, further comprising:

displaying an interface for displaying the editing interval in a compressed form; and displaying the length of the editing interval in a reduced form in response to a user input of displaying the editing interval in a compressed form.

21. The video editing method according to claim 1, wherein the changing includes generating additional information corresponding to the edited playback attributes of the partial sequence.

22. The video editing method according to claim 1, wherein the changing includes encoding the video sequence based on the edited playback attributes of the partial sequence.

23. A digital device comprising:

a processor configured to control an operation of the digital device;

a sensor unit configured to receive a touch input and transmitting the touch input to the processor; and a display unit configured to output images based on a command of the processor, wherein the processor is further configured to:

display a timeline interface corresponding to a video sequence, wherein the timeline interface displays a plurality of thumbnail images of the video sequence at a preset interval on the timeline interface, specify a first location on the timeline interface by receiving a first touch input, and a second location on the timeline interface by receiving a second touch input, wherein the first location corresponds to a first frame of the video sequence and the second location corresponds to a second frame of the video sequence, set an editing interval between the first location and the second location of the timeline interface, wherein a first indicator corresponding to the first frame and a second indicator corresponding to the second frame are displayed at both ends of the editing interval, at least one of the first indicator and the second indicator is movable on the timeline interface, the editing interval corresponds to a partial sequence of the video sequence, and the partial sequence is a sequence between the first frame and the second frame of the video sequence, receive a third touch input with respect to the editing interval, wherein the third touch input includes a touch input of sliding at least one of the first indicator and the second indicator along the timeline interface, adjust a thickness and length of the editing interval in response to the third touch input, wherein the thickness of the editing interval is proportional to a playback speed of the partial sequence and the length of the editing interval is proportional to a playback duration of the partial sequence, wherein the playback speed of the partial sequence increases when the thickness of the editing interval is enlarged, and the playback speed of the partial sequence decreases when the thickness of the editing interval is reduced, and wherein the playback speed of the partial sequence increases when the length of the editing interval is shortened, and the playback speed of the partial sequence decreases when the length of the editing interval is enlarged, and change playback attributes of the partial sequence according to the adjusted thickness and length of the editing interval, wherein the playback attributes of the partial sequence include the playback speed of the partial sequence.

24. The video editing method according to claim 1, wherein the timeline interface displays a progress indicator moving at a constant speed on the timeline interface.

* * * * *